US009754190B1

(12) United States Patent
Guttmann

(10) Patent No.: US 9,754,190 B1
(45) Date of Patent: Sep. 5, 2017

(54) SYSTEM AND METHOD FOR IMAGE CLASSIFICATION BASED ON TSALLIS ENTROPY

(71) Applicant: Moshe Guttmann, Tel Aviv (IL)

(72) Inventor: Moshe Guttmann, Tel Aviv (IL)

(73) Assignee: Seematics Systems Ltd, Ramat Gan (IL)

( * ) Notice: Subject to any disclaimer, the term of this patent is extended or adjusted under 35 U.S.C. 154(b) by 0 days.

(21) Appl. No.: 15/363,696

(22) Filed: Nov. 29, 2016

(51) Int. Cl.
　　*G06K 9/62*　　(2006.01)
　　*G06K 9/46*　　(2006.01)
　　*H04B 1/3827*　　(2015.01)
　　*H04L 29/08*　　(2006.01)

(52) U.S. Cl.
　　CPC ......... *G06K 9/6268* (2013.01); *G06K 9/4671* (2013.01); *H04B 1/3827* (2013.01); *H04L 67/10* (2013.01)

(58) Field of Classification Search
　　CPC .. G06K 9/6268; G06K 9/4671; H04B 1/3827; H04L 67/10
　　See application file for complete search history.

(56) References Cited

U.S. PATENT DOCUMENTS

2014/0330159 A1* 11/2014 Costa .................. A61B 5/1124
　　　　　　　　　　　　　　　　　　　　　　600/558
2015/0278224 A1* 10/2015 Jaber .................. G06F 17/3053
　　　　　　　　　　　　　　　　　　　　　　707/749

OTHER PUBLICATIONS

Maszczyk et al, "Comparison of Shannon, Renyi, and Tsallis Entropy used in Decision Tree" Department of Informatics, Lecture Notes in Computer Science, vol. 5097, pp. 643-651, 2008, Nicolaus Copernicus University, Poland.*
Wang et al, "Unifyingthe Split Criteria of Decision Trees Using Tsallis Entropy", Department of Computer Science and Technology, Tsinghua University, Beijing, China, 2015.*

* cited by examiner

*Primary Examiner* — Yon Couso

(57) ABSTRACT

System and method for image classification based on Tsallis entropy are provided. An image may be segmented to obtain image regions. The image regions may be analyzed to generate histograms. The histograms may be analyzed to compute Tsallis entropy values. The image regions may be associated with categories based on the Tsallis entropy values. Image regions associated with a first category may be classified to obtain classification information. The classification information may be transmitted to an external device. Information related to image regions associated with a second category may be transmitted to the external device. The external device may be configured to classify the image regions associated with the second category based on the transmitted information.

17 Claims, 21 Drawing Sheets

SYSTEM AND METHOD FOR IMAGE CLASSIFICATION BASED ON TSALLIS ENTROPY

BACKGROUND

Technological Field

The disclosed embodiments generally relate to systems and methods for image classification. More particularly, the disclosed embodiments relate to systems and methods for image classification based on Tsallis entropy.

Background Information

Image sensors are now part of numerous devices, from security systems to mobile phones, and the availability of images and videos produced by these devices is increasing.

Image classification models are often used to automatically label images.

Tsallis entropy is a generalization of the standard Boltzmann-Gibbs entropy. Tsallis entropy is used in a number of image processing and computer vision applications.

SUMMARY

In some embodiments, apparatuses and methods for inferring information are provided.

In some embodiments, systems and methods for updating inference models are provided.

In some embodiments, systems and methods for generating inference models are provided.

In some embodiments, systems and methods for image classification based on Tsallis entropy are provided.

In some embodiments, input data and inference model may be obtained. A result of applying the input data to the inference model may be generated. Information based on the generated result may be transmitted. Update to the inference model may be received. The updated inference model may be used to obtain additional results.

In some embodiments, data request may be received. A portion of the input data may be selected, for example based on the data request. The selected portion of the input data may be transmitted.

In some embodiments, information based on a result of applying input data to an inference model may be received. An update to the inference model may be generated based on the received information. The generated update may be transmitted.

In some embodiments, a data request may be transmitted. A portion of the input data may be received, for example in response to the data request.

In some embodiments, scene information may be generated. The scene information may be transmitted. An inference model may be received, for example in response to the transmitted scene information. Input data may be obtained. A result of applying the input data to the received inference model may be generated. The generated result may be transmitted. The input data may be transmitted.

In some embodiments, scene information may be received. Inference models may be generated based on the scene information. At least one of the generated inference models may be transmitted. A result of applying input data to the transmitted inference model may be received. Input data may be received. A result of applying the received input data to at least one of the generated inference models may be generated. In some cases, a notification may be provided based on the received result and the generated result.

In some embodiments, an image may be segmented to obtain image regions. The image regions may be analyzed to generate histograms. The histograms may be analyzed to compute Tsallis entropy values. The image regions may be associated with categories based on the Tsallis entropy values. In some examples, image regions associated with a first category may be classified to obtain classification information. In some examples, the classification information may be transmitted to an external device. In some examples, information related to image regions associated with a second category may be transmitted to the external device. In some examples, the external device may be configured to classify the image regions associated with the second category based on the transmitted information.

In some embodiments, a similarity matrix may be calculated, for example by calculating similarities between pairs of image pixels. Singular vectors of the similarity matrix may be extracted.

In some embodiments, classification information may be received. Information related to image regions may be received. The image regions may be classified based on the received information. In some cases, a notification may be provided based on the received classification information and on the classification of the image regions.

DESCRIPTION

Figure 1A:
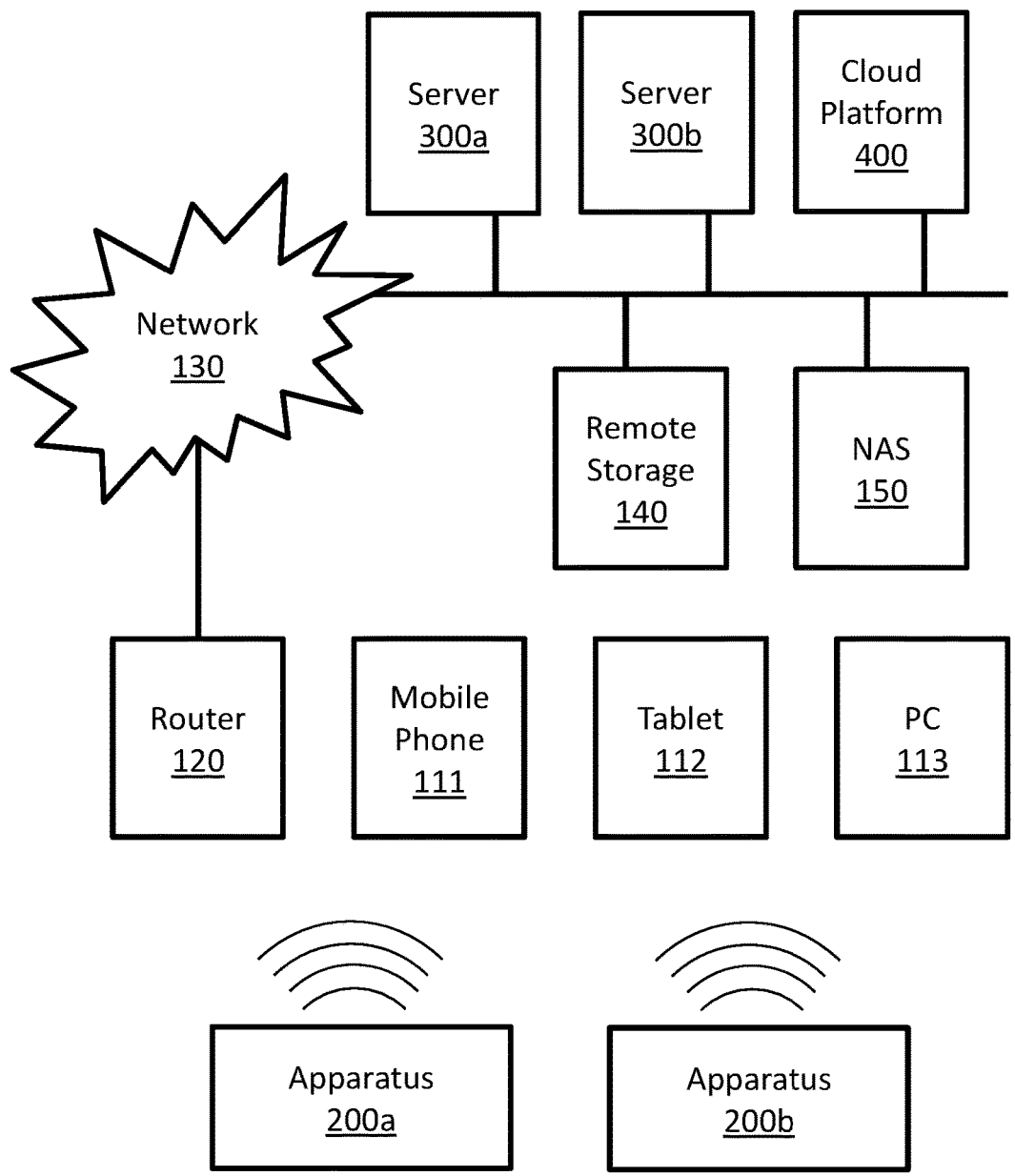
FIGS. 1A and 1B are block diagrams illustrating some possible implementations of a communicating system.

Unless specifically stated otherwise, as apparent from the following discussions, it is appreciated that throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", or the like, include action and/or processes of a computer that manipulate and/or transform data into other data, said data represented as physical quantities, for example such as electronic quantities, and/or said data representing the physical objects. The terms "computer", "processor", "controller", "processing unit", "computing unit", and "processing module" should be expansively construed to cover any kind of electronic device, component or unit with data processing capabilities, including, by way of non-limiting example, a personal computer, a wearable computer, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a core within a processor, any other electronic computing device, or any combination of the above.

The operations in accordance with the teachings herein may be performed by a computer specially constructed or programmed to perform the described functions.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) may be included in at least one embodiment of the presently disclosed subject matter. Thus the appearance of the phrase "one case", "some cases", "other cases" or variants thereof does not necessarily refer to the same embodiment(s). As used herein, the term "and/or" includes any and all combinations of one or more of the associated listed items.

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

The term "image sensor" is recognized by those skilled in the art and refers to any device configured to capture images, a sequence of images, videos, and so forth. This includes sensors that convert optical input into images, where optical input can be visible light (like in a camera), radio waves, microwaves, terahertz waves, ultraviolet light, infrared light, x-rays, gamma rays, and/or any other light spectrum. This also includes both 2D and 3D sensors. Examples of image sensor technologies may include: CCD, CMOS, NMOS, and so forth. 3D sensors may be implemented using different technologies, including: stereo camera, active stereo camera, time of flight camera, structured light camera, radar, range image camera, and so forth.

The term "audio sensor" is recognized by those skilled in the art and refers to any device configured to capture audio data. This includes sensors that convert audio and sounds into digital audio data.

The term "pressure sensor" is recognized by those skilled in the art and refers to a sensor that detects and/or measures pressure in its vicinity. This includes differential pressure sensors that measure the difference in pressure between two or more points. This also includes pressure sensor arrays that provide images of pressure on a contact surface. This also includes directional pressure sensors that detect and/or measure pressure applied in a particular direction.

The term "electrical impedance sensor" is recognized by those skilled in the art and refers to any sensor configured to measure the electrical connectivity and/or permittivity between two or more points. This include but not limited to: sensors configured to measuring changes in connectivity and/or permittivity over time; sensors configured to measure the connectivity and/or permittivity of biological tissues; sensors configured to measure the connectivity and/or permittivity of parts of body based, at least in part, on the connectivity and/or permittivity between surface electrodes; sensors configured to provide Electrical Impedance Tomography images, and so forth. Such sensors may include but not limited to: sensors that apply alternating currents at a single frequency; sensors that apply alternating currents at multiple frequencies; and so forth. Additionally, this may also include sensors that measure the electrical resistance between two or more points, which are sometimes referred to as ohmmeter.

The term "electrical voltage sensor" is recognized by those skilled in the art and refers to any sensor configured to measure the electrical potential difference between two or more points. This kind of sensors are also sometimes referred to by other names, including voltmeter, electrometer, and so on.

In embodiments of the presently disclosed subject matter, one or more stages illustrated in the figures may be executed in a different order and/or one or more groups of stages may be executed simultaneously and vice versa. The figures illustrate a general schematic of the system architecture in accordance embodiments of the presently disclosed subject matter. Each module in the figures can be made up of any combination of software, hardware and/or firmware that performs the functions as defined and explained herein. The modules in the figures may be centralized in one location or dispersed over more than one location.

It should be noted that some examples of the presently disclosed subject matter are not limited in application to the details of construction and the arrangement of the components set forth in the following description or illustrated in the drawings. The invention can be capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing may have the same use and description as in the previous drawings.

The drawings in this document may not be to any scale. Different figures may use different scales and different scales can be used even within the same drawing, for example different scales for different views of the same object or different scales for the two adjacent objects.

FIG. 1A is a block diagram illustrating a possible implementation of a communicating system. In this example, apparatuses 200a and 200b may communicate with server 300a, with server 300b, with cloud platform 400, with each other, and so forth. Possible implementations of apparatuses 200a and 200b may include apparatus 200 as described in FIGS. 2A and 2B. Possible implementations of servers 300a and 300b may include server 300 as described in FIG. 3. Some possible implementations of cloud platform 400 are described in FIGS. 4A, 4B and 5. In this example apparatuses 200a and 200b may communicate directly with mobile phone 111, tablet 112, and personal computer (PC) 113. Apparatuses 200a and 200b may communicate with local router 120 directly, and/or through at least one of mobile phone 111, tablet 112, and personal computer (PC) 113. In this example, local router 120 may be connected with a communication network 130. Examples of communication network 130 may include the Internet, phone networks, cellular networks, satellite communication networks, private communication networks, virtual private networks (VPN), and so forth. Apparatuses 200*a* and 200*b* may connect to communication network 130 through local router 120 and/or directly. Apparatuses 200*a* and 200*b* may communicate with other devices, such as servers 300*a*, server 300*b*, cloud platform 400, remote storage 140 and network attached storage (NAS) 150, through communication network 130 and/or directly.

Figure 1B:
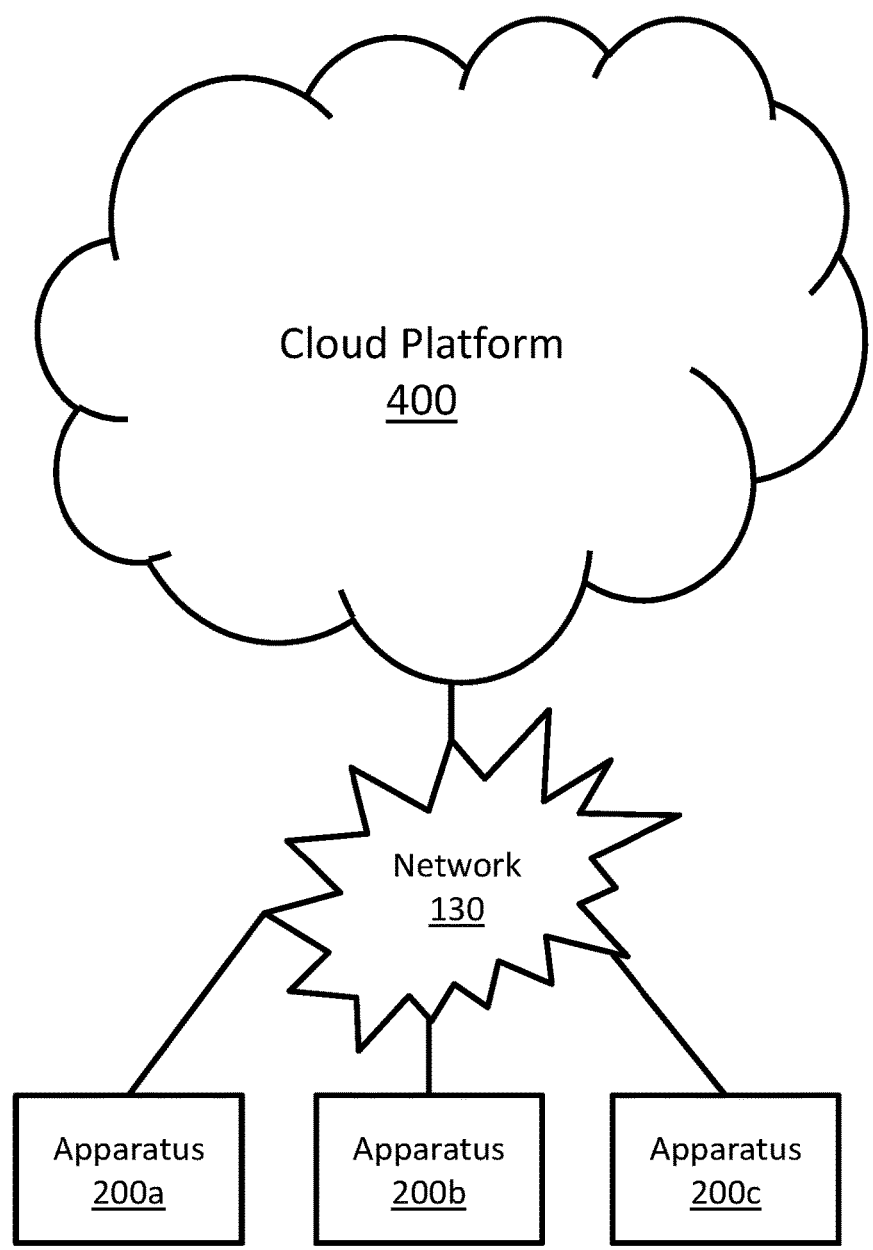

FIG. 1B is a block diagram illustrating a possible implementation of a communicating system. In this example, apparatuses 200*a*, 200*b* and 200*c* may communicate with cloud platform 400 and/or with each other through communication network 130. Possible implementations of apparatuses 200*a*, 200*b* and 200*c* may include apparatus 200 as described in FIGS. 2A and 2B. Some possible implementations of cloud platform 400 are described in FIGS. 4A, 4B and 5.

FIGS. 1A and 1B illustrate some possible implementations of a communication system. In some embodiments, other communication systems that enable communication between apparatus 200 and server 300 may be used. In some embodiments, other communication systems that enable communication between apparatus 200 and cloud platform 400 may be used. In some embodiments, other communication systems that enable communication among a plurality of apparatuses 200 may be used.

Figure 2A:
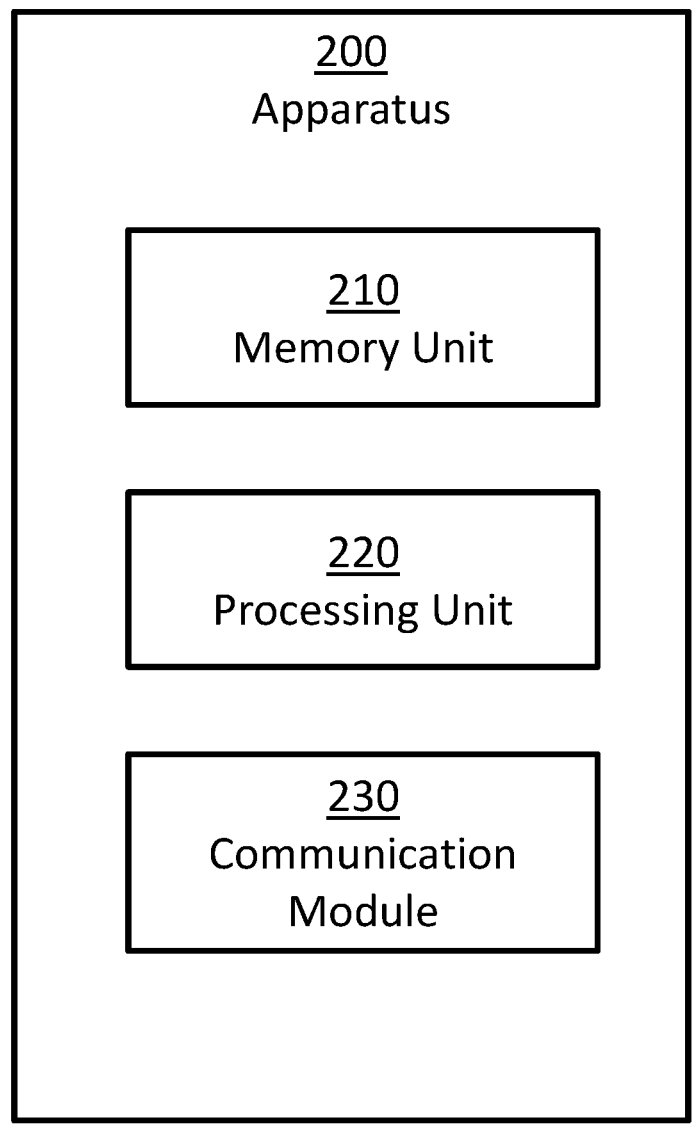
FIGS. 2A and 2B are block diagrams illustrating some possible implementations of an apparatus.

FIG. 2A is a block diagram illustrating a possible implementation of apparatus 200. In this example, apparatus 200 may comprise: one or more memory units 210, one or more processing units 220, and one or more communication modules 230. In some implementations, apparatus 200 may comprise additional components, while some components listed above may be excluded.

Figure 2B:
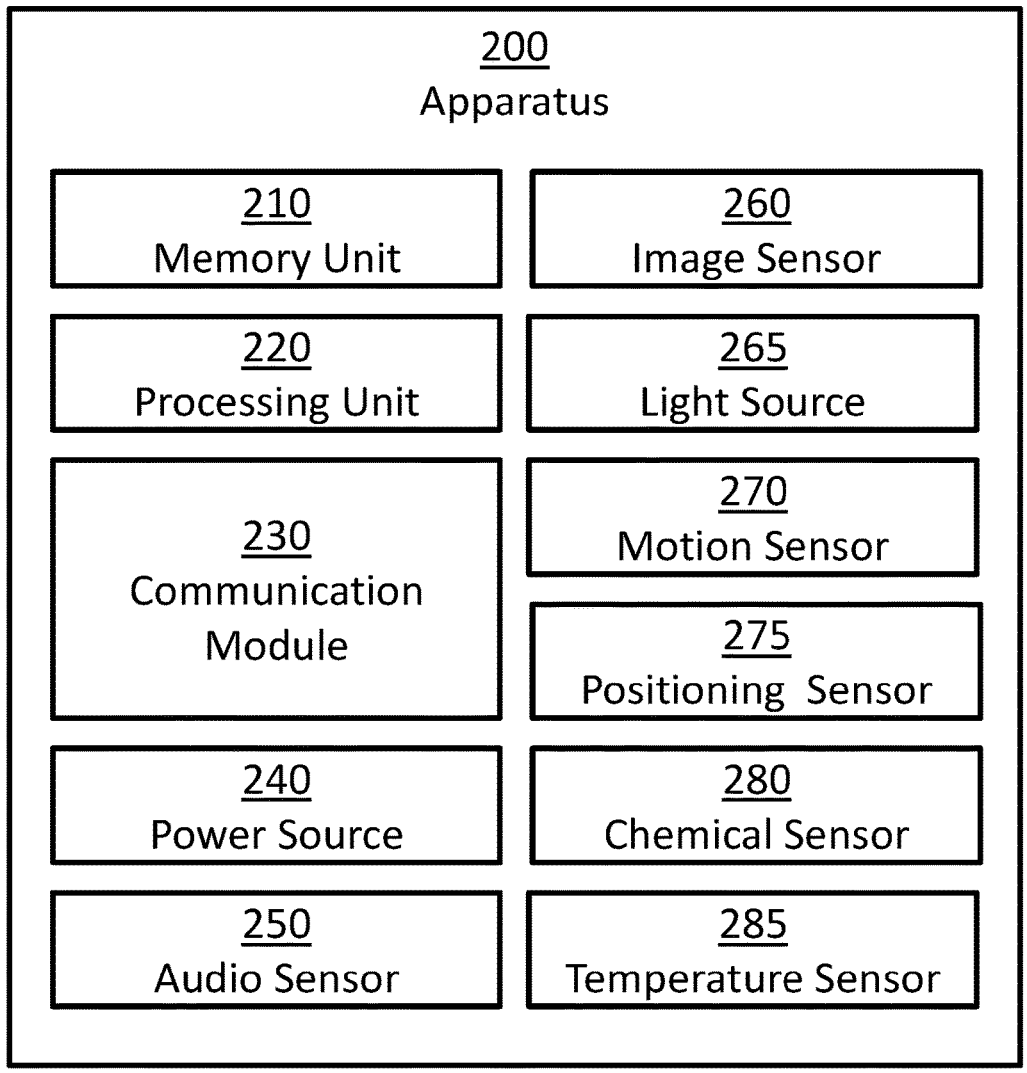

FIG. 2B is a block diagram illustrating a possible implementation of apparatus 200. In this example, apparatus 200 may comprise: one or more memory units 210, one or more processing units 220, one or more communication modules 230, one or more power sources 240, one or more audio sensors 250, one or more image sensors 260, one or more light sources 265, one or more motion sensors 270, one or more positioning sensors 275, one or more chemical sensors 280, and one or more temperature sensors 285. In some implementations, apparatus 200 may comprise additional components, while some components listed above may be excluded. For example, in some implementations apparatus 200 may also comprise at least one of the following: one or more barometers; one or more pressure sensors; one or more proximity sensors; one or more electrical impedance sensors; one or more electrical voltage sensors; one or more electrical current sensors; one or more user input devices; one or more output devices; and so forth. In another example, in some implementations at least one of the following may be excluded from apparatus 200: memory units 210, communication modules 230, power sources 240, audio sensors 250, image sensors 260, light sources 265, motion sensors 270, positioning sensors 275, chemical sensors 280, and temperature sensors 285.

In some embodiments, one or more power sources 240 may be configured to: power apparatus 200; power server 300; power cloud platform 400; and/or power computational node 500. Possible implementation examples of power sources 240 may include: one or more electric batteries; one or more capacitors; one or more connections to external power sources; one or more power convertors; any combination of the above; and so forth.

In some embodiments, the one or more processing units 220 may be configured to execute software programs. For example, processing units 220 may be configured to execute software programs stored on the memory units 210. In some cases, the executed software programs may store information in memory units 210. In some cases, the executed software programs may retrieve information from the memory units 210. Possible implementation examples of the processing units 220 may include: one or more single core processors, one or more multicore processors; one or more controllers; one or more application processors; one or more system on a chip processors; one or more central processing units; one or more graphical processing units; one or more neural processing units; any combination of the above; and so forth.

In some embodiments, the one or more communication modules 230 may be configured to receive and transmit information. For example, control signals may be transmitted and/or received through communication modules 230. In another example, information received though communication modules 230 may be stored in memory units 210. In an additional example, information retrieved from memory units 210 may be transmitted using communication modules 230. In another example, input data may be transmitted and/or received using communication modules 230. Examples of such input data may include: input data inputted by a user using user input devices; information captured using one or more sensors; and so forth. Examples of such sensors may include: audio sensors 250; image sensors 260; motion sensors 270; positioning sensors 275; chemical sensors 280; temperature sensors 285; barometers; pressure sensors; proximity sensors; electrical impedance sensors; electrical voltage sensors; electrical current sensors; and so forth.

In some embodiments, the one or more audio sensors 250 may be configured to capture audio by converting sounds to digital information. Some examples of audio sensors 250 may include: microphones, unidirectional microphones, bidirectional microphones, cardioid microphones, omnidirectional microphones, onboard microphones, wired microphones, wireless microphones, any combination of the above, and so forth. In some examples, the captured audio may be stored in memory units 210. In some additional examples, the captured audio may be transmitted using communication modules 230, for example to other computerized devices, such as server 300, cloud platform 400, computational node 500, and so forth. In some examples, processing units 220 may control the above processes. For example, processing units 220 may control at least one of: capturing of the audio; storing the captured audio; transmitting of the captured audio; and so forth. In some cases, the captured audio may be processed by processing units 220. For example, the captured audio may be compressed by processing units 220; possibly followed: by storing the compressed captured audio in memory units 210; by transmitted the compressed captured audio using communication modules 230; and so forth. In another example, the captured audio may be processed using speech recognition algorithms. In another example, the captured audio may be processed using speaker recognition algorithms.

In some embodiments, the one or more image sensors 260 may be configured to capture visual information by converting light to: images; sequence of images; videos; and so forth. In some examples, the captured visual information may be stored in memory units 210. In some additional examples, the captured visual information may be transmitted using communication modules 230, for example to other computerized devices, such as server 300, cloud platform 400, computational node 500, and so forth. In some examples, processing units 220 may control the above processes. For example, processing units 220 may control at least one of: capturing of the visual information; storing the captured visual information; transmitting of the captured visual information; and so forth. In some cases, the captured visual information may be processed by processing units 220. For example, the captured visual information may be compressed by processing units 220; possibly followed: by storing the compressed captured visual information in memory units 210; by transmitted the compressed captured visual information using communication modules 230; and so forth. In another example, the captured visual information may be processed in order to: detect objects, detect events, detect action, detect face, detect people, recognize person, and so forth.

In some embodiments, the one or more light sources 265 may be configured to emit light, for example in order to enable better image capturing by image sensors 260. In some examples, the emission of light may be coordinated with the capturing operation of image sensors 260. In some examples, the emission of light may be continuous. In some examples, the emission of light may be performed at selected times. The emitted light may be visible light, infrared light, x-rays, gamma rays, and/or in any other light spectrum.

In some embodiments, the one or more motion sensors 270 may be configured to perform at least one of the following: detect motion of objects in the environment of apparatus 200; measure the velocity of objects in the environment of apparatus 200; measure the acceleration of objects in the environment of apparatus 200; detect motion of apparatus 200; measure the velocity of apparatus 200; measure the acceleration of apparatus 200; and so forth. In some implementations, the one or more motion sensors 270 may comprise one or more accelerometers configured to detect changes in proper acceleration and/or to measure proper acceleration of apparatus 200. In some implementations, the one or more motion sensors 270 may comprise one or more gyroscopes configured to detect changes in the orientation of apparatus 200 and/or to measure information related to the orientation of apparatus 200. In some implementations, motion sensors 270 may be implemented using image sensors 260, for example by analyzing images captured by image sensors 260 to perform at least one of the following tasks: track objects in the environment of apparatus 200; detect moving objects in the environment of apparatus 200; measure the velocity of objects in the environment of apparatus 200; measure the acceleration of objects in the environment of apparatus 200; measure the velocity of apparatus 200, for example by calculating the egomotion of image sensors 260; measure the acceleration of apparatus 200, for example by calculating the egomotion of image sensors 260; and so forth. In some implementations, motion sensors 270 may be implemented using image sensors 260 and light sources 265, for example by implementing a LIDAR using image sensors 260 and light sources 265. In some implementations, motion sensors 270 may be implemented using one or more RADARs. In some examples, information captured using motion sensors 270: may be stored in memory units 210, may be processed by processing units 220, may be transmitted and/or received using communication modules 230, and so forth.

In some embodiments, the one or more positioning sensors 275 may be configured to obtain positioning information of apparatus 200, to detect changes in the position of apparatus 200, and/or to measure the position of apparatus 200. In some examples, positioning sensors 275 may be implemented using one of the following technologies: Global Positioning System (GPS), GLObal NAvigation Satellite System (GLONASS), Galileo global navigation system, BeiDou navigation system, other Global Navigation Satellite Systems (GNSS), Indian Regional Navigation Satellite System (IRNSS), Local Positioning Systems (LPS), Real-Time Location Systems (RTLS), Indoor Positioning System (IPS), Wi-Fi based positioning systems, cellular triangulation, and so forth. In some examples, information captured using positioning sensors 275 may be stored in memory units 210, may be processed by processing units 220, may be transmitted and/or received using communication modules 230, and so forth.

In some embodiments, the one or more chemical sensors 280 may be configured to perform at least one of the following: measure chemical properties in the environment of apparatus 200; measure changes in the chemical properties in the environment of apparatus 200; detect the present of chemicals in the environment of apparatus 200; measure the concentration of chemicals in the environment of apparatus 200. Examples of such chemical properties may include: pH level, toxicity, temperature, and so forth. Examples of such chemicals may include: electrolytes, particular enzymes, particular hormones, particular proteins, smoke, carbon dioxide, carbon monoxide, oxygen, ozone, hydrogen, hydrogen sulfide, and so forth. In some examples, information captured using chemical sensors 280 may be stored in memory units 210, may be processed by processing units 220, may be transmitted and/or received using communication modules 230, and so forth.

In some embodiments, the one or more temperature sensors 285 may be configured to detect changes in the temperature of the environment of apparatus 200 and/or to measure the temperature of the environment of apparatus 200. In some examples, information captured using temperature sensors 285 may be stored in memory units 210, may be processed by processing units 220, may be transmitted and/or received using communication modules 230, and so forth.

In some embodiments, the one or more barometers may be configured to detect changes in the atmospheric pressure in the environment of apparatus 200 and/or to measure the atmospheric pressure in the environment of apparatus 200. In some examples, information captured using the barometers may be stored in memory units 210, may be processed by processing units 220, may be transmitted and/or received using communication modules 230, and so forth.

In some embodiments, the one or more pressure sensors may be configured to perform at least one of the following: detect pressure in the environment of apparatus 200; measure pressure in the environment of apparatus 200; detect change in the pressure in the environment of apparatus 200; measure change in pressure in the environment of apparatus 200; detect pressure at a specific point and/or region of the surface area of apparatus 200; measure pressure at a specific point and/or region of the surface area of apparatus 200; detect change in pressure at a specific point and/or area; measure change in pressure at a specific point and/or region of the surface area of apparatus 200; measure the pressure differences between two specific points and/or regions of the surface area of apparatus 200; measure changes in relative pressure between two specific points and/or regions of the surface area of apparatus 200. In some examples, information captured using the pressure sensors may be stored in memory units 210, may be processed by processing units 220, may be transmitted and/or received using communication modules 230, and so forth.

In some embodiments, the one or more proximity sensors may be configured to perform at least one of the following: detect contact of a solid object with the surface of apparatus 200; detect contact of a solid object with a specific point and/or region of the surface area of apparatus 200; detect a proximity of apparatus 200 to an object. In some implementations, proximity sensors may be implemented using image sensors 260 and light sources 265, for example by emitting light using light sources 265, such as ultraviolet light, visible light, infrared light and/or microwave light, and detecting the light reflected from nearby objects using image sensors 260 to detect the present of nearby objects. In some examples, information captured using the proximity sensors may be stored in memory units 210, may be processed by processing units 220, may be transmitted and/or received using communication modules 230, and so forth.

In some embodiments, the one or more electrical impedance sensors may be configured to perform at least one of the following: detect change over time in the connectivity and/or permittivity between two electrodes; measure changes over time in the connectivity and/or permittivity between two electrodes; capture Electrical Impedance Tomography (EIT) images. In some examples, information captured using the electrical impedance sensors may be stored in memory units 210, may be processed by processing units 220, may be transmitted and/or received using communication modules 230, and so forth.

In some embodiments, the one or more electrical voltage sensors may be configured to perform at least one of the following: detect and/or measure voltage between two electrodes; detect and/or measure changes over time in the voltage between two electrodes. In some examples, information captured using the electrical voltage sensors may be stored in memory units 210, may be processed by processing units 220, may be transmitted and/or received using communication modules 230, and so forth.

In some embodiments, the one or more electrical current sensors may be configured to perform at least one of the following: detect and/or measure electrical current flowing between two electrodes; detect and/or measure changes over time in the electrical current flowing between two electrodes. In some examples, information captured using the electrical current sensors may be stored in memory units 210, may be processed by processing units 220, may be transmitted and/or received using communication modules 230, and so forth.

In some embodiments, the one or more user input devices may be configured to allow one or more users to input information. In some examples, user input devices may comprise at least one of the following: a keyboard, a mouse, a touch pad, a touch screen, a joystick, a microphone, an image sensor, and so forth. In some examples, the user input may be in the form of at least one of: text, sounds, speech, hand gestures, body gestures, tactile information, and so forth. In some examples, the user input may be stored in memory units 210, may be processed by processing units 220, may be transmitted and/or received using communication modules 230, and so forth.

In some embodiments, the one or more user output devices may be configured to provide output information to one or more users. In some examples, such output information may comprise of at least one of: notifications, feedbacks, reports, and so forth. In some examples, user output devices may comprise at least one of: one or more audio output devices; one or more textual output devices; one or more visual output devices; one or more tactile output devices; and so forth. In some examples, the one or more audio output devices may be configured to output audio to a user, for example through: a headset, a set of speakers, and so forth. In some examples, the one or more visual output devices may be configured to output visual information to a user, for example through: a display screen, an augmented reality display system, a printer, a LED indicator, and so forth. In some examples, the one or more tactile output devices may be configured to output tactile feedbacks to a user, for example through vibrations, through motions, by applying forces, and so forth. In some examples, the output may be provided: in real time, offline, automatically, upon request, and so forth. In some examples, the output information may be read from memory units 210, may be provided by a software executed by processing units 220, may be transmitted and/or received using communication modules 230, and so forth.

Figure 3:
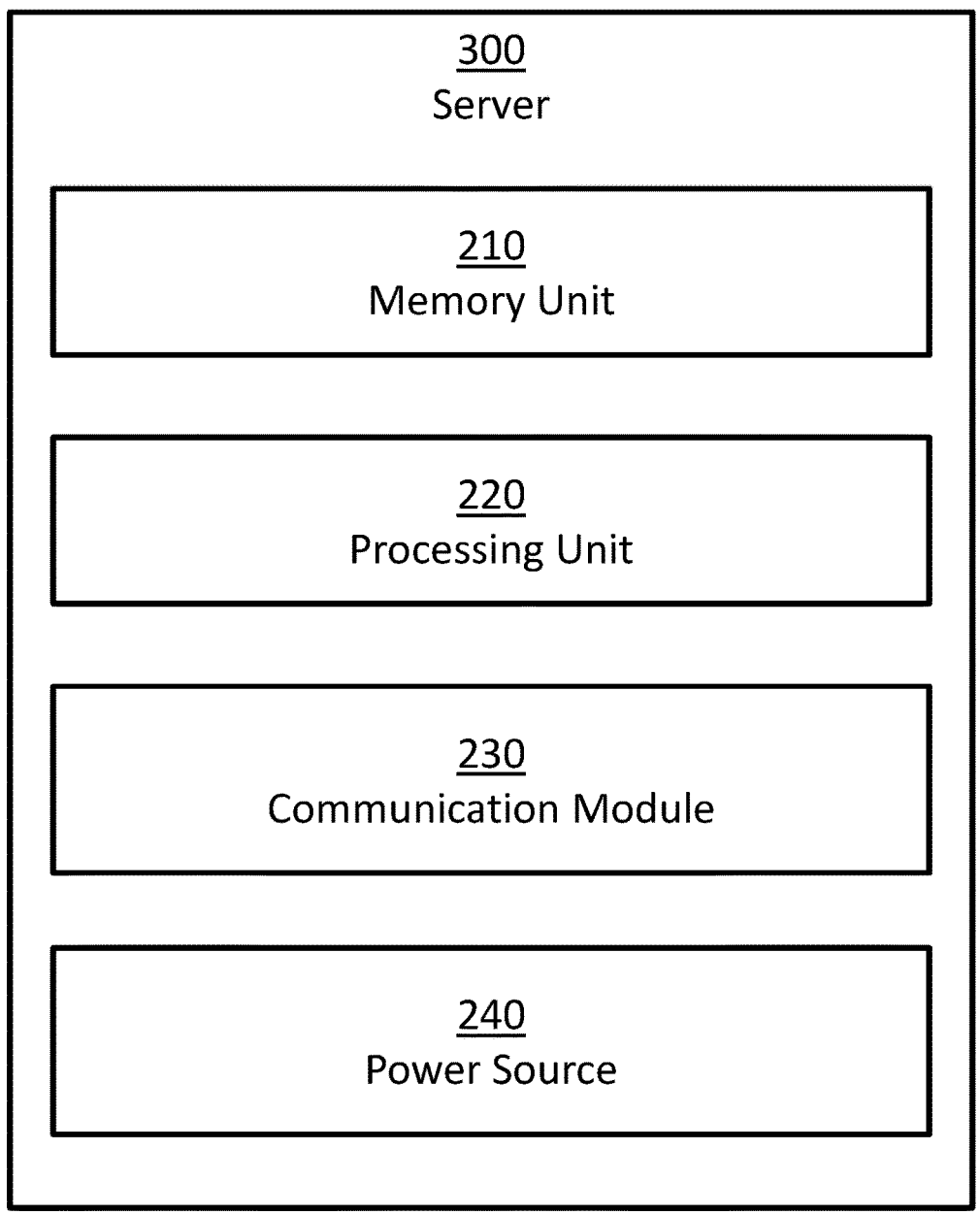
FIG. 3 is a block diagram illustrating a possible implementation of a server.

FIG. 3 is a block diagram illustrating a possible implementation of server 300. In this example, server 300 may comprise: one or more memory units 210, one or more processing units 220, one or more communication modules 230, and one or more power sources 240. In some implementations, server 300 may comprise additional components, while some components listed above may be excluded. For example, in some implementations server 300 may also comprise at least one of the following: one or more user input devices; one or more output devices; and so forth. In another example, in some implementations at least one of the following may be excluded from server 300: memory units 210, communication modules 230, and power sources 240.

Figure 4A:
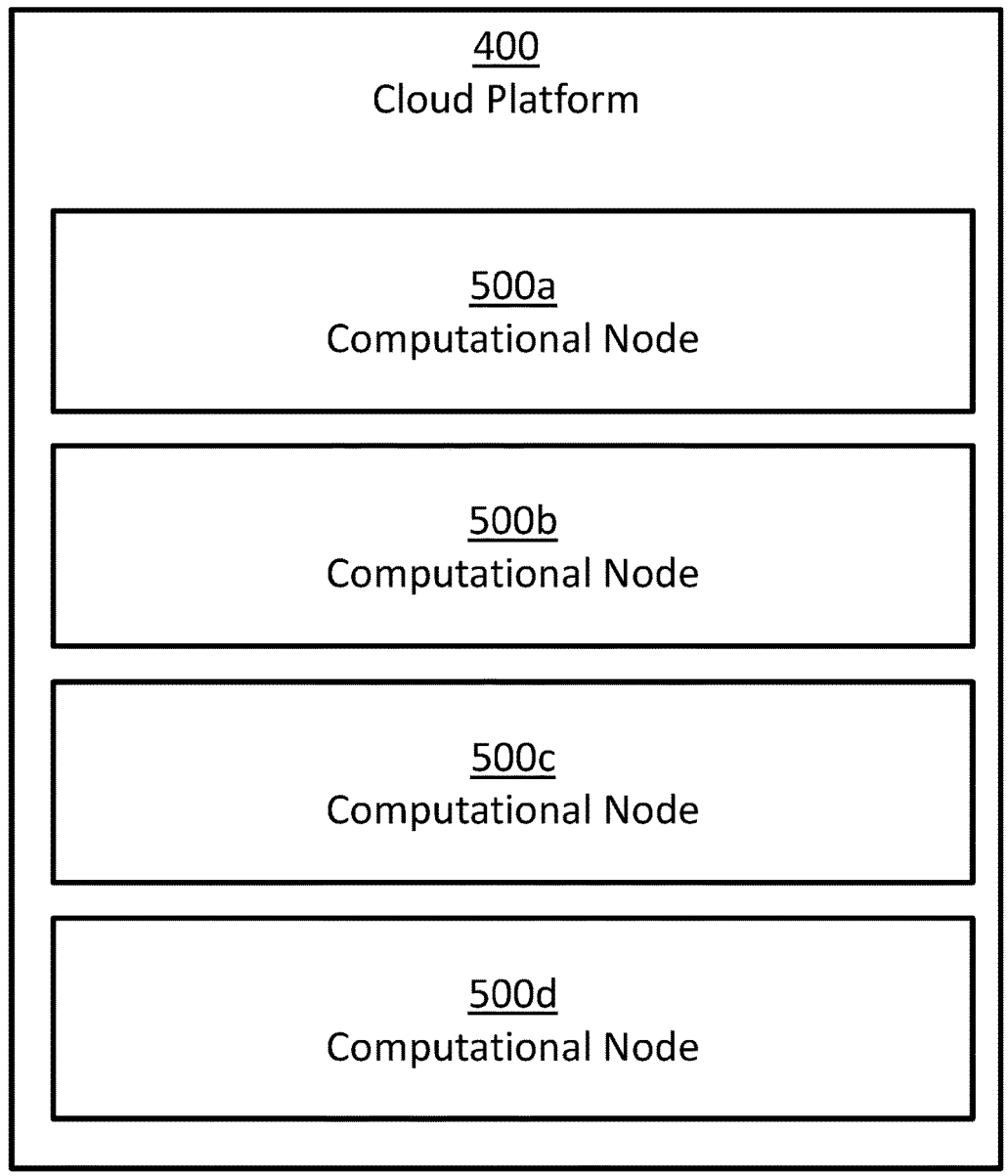
FIGS. 4A and 4B are block diagrams illustrating some possible implementations of a cloud platform.

FIG. 4A is a block diagram illustrating a possible implementation of cloud platform 400. In this example, cloud platform 400 may comprise computational node 500a, computational node 500b, computational node 500c and computational node 500d. In some examples, a possible implementation of computational nodes 500a, 500b, 500c and 500d may comprise server 300 as described in FIG. 3. In some examples, a possible implementation of computational nodes 500a, 500b, 500c and 500d may comprise computational node 500 as described in FIG. 5.

Figure 4B:
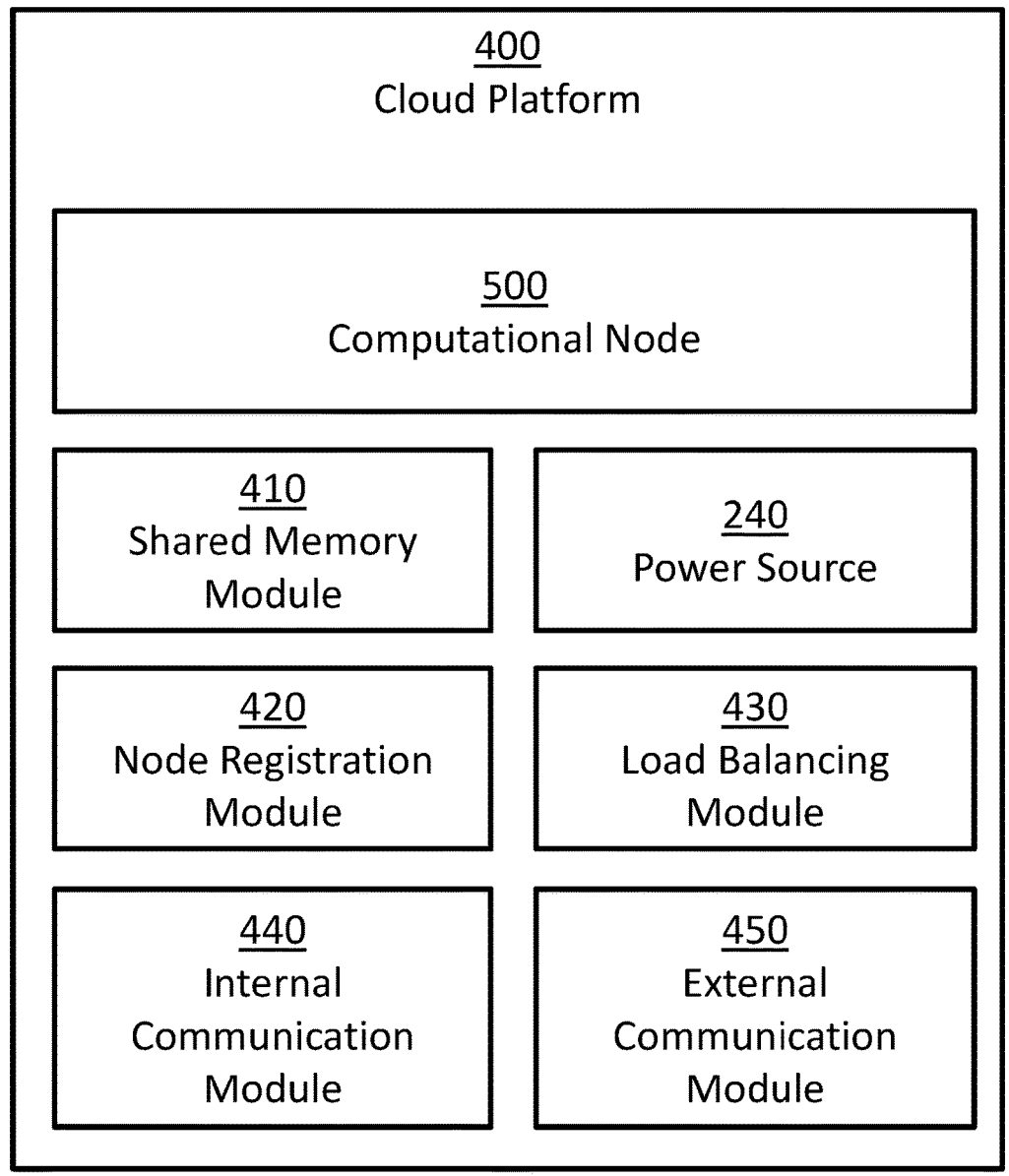

FIG. 4B is a block diagram illustrating a possible implementation of cloud platform 400. In this example, cloud platform 400 may comprise: one or more computational nodes 500, one or more shared memory modules 410, one or more power sources 240, one or more node registration modules 420, one or more load balancing modules 430, one or more internal communication modules 440, and one or more external communication modules 450. In some implementations, cloud platform 400 may comprise additional components, while some components listed above may be excluded. For example, in some implementations cloud platform 400 may also comprise at least one of the following: one or more user input devices; one or more output devices; and so forth. In another example, in some implementations at least one of the following may be excluded from cloud platform 400: shared memory modules 410, power sources 240, node registration modules 420, load balancing modules 430, internal communication modules 440, and external communication modules 450.

Figure 5:
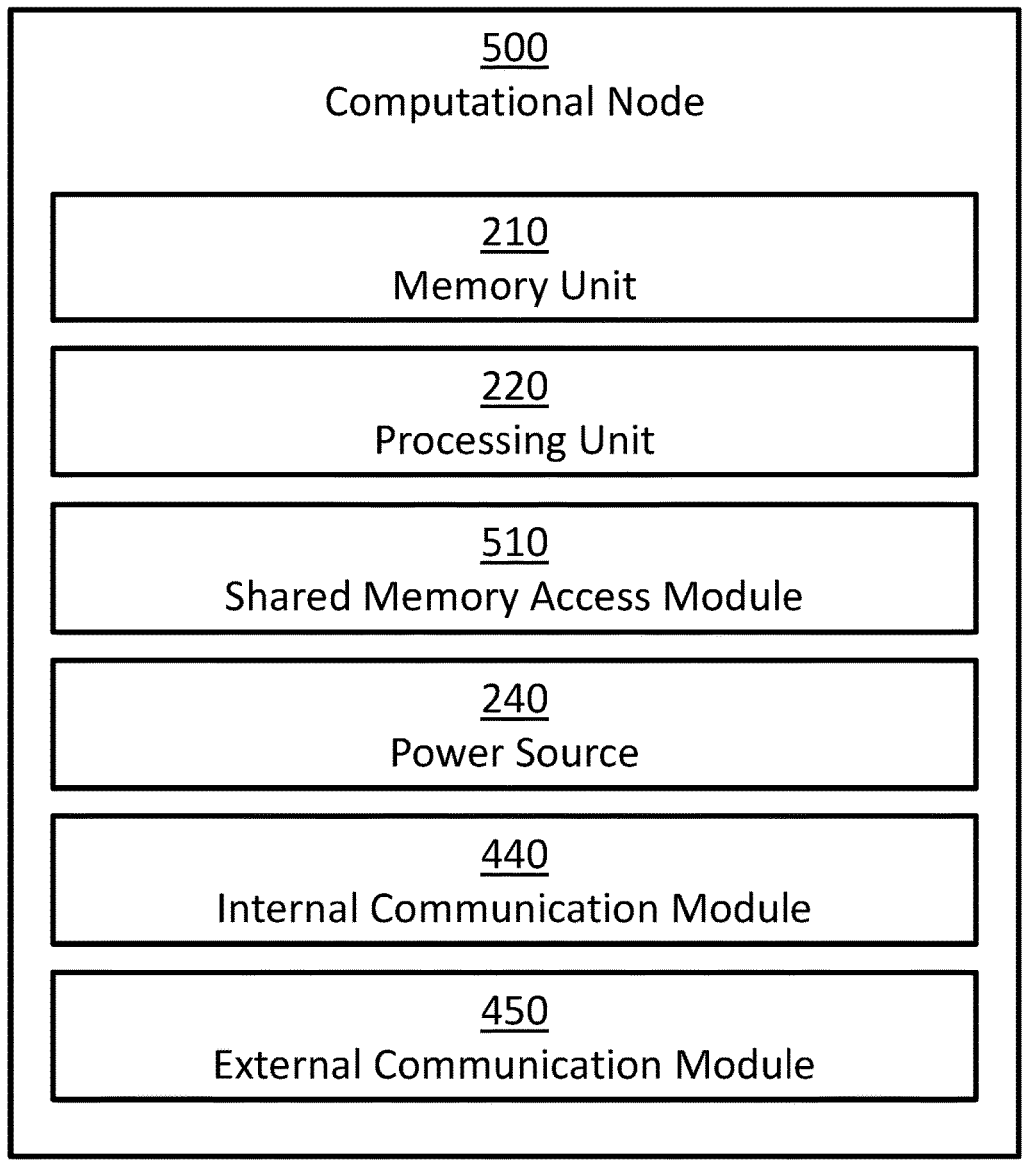
FIG. 5 is a block diagram illustrating a possible implementation of a computational node.

FIG. 5 is a block diagram illustrating a possible implementation of computational node 500. In this example, computational node 500 may comprise: one or more memory units 210, one or more processing units 220, one or more shared memory access modules 510, one or more power sources 240, one or more internal communication modules 440, and one or more external communication modules 450. In some implementations, computational node 500 may comprise additional components, while some components listed above may be excluded. For example, in some implementations computational node 500 may also comprise at least one of the following: one or more user input devices; one or more output devices; and so forth. In another example, in some implementations at least one of the following may be excluded from computational node 500: memory units 210, shared memory access modules 510, power sources 240, internal communication modules 440, and external communication modules 450.

In some embodiments, internal communication modules 440 and external communication modules 450 may be implemented as a combined communication module, such as communication modules 230. In some embodiments, one possible implementation of cloud platform 400 may comprise server 300. In some embodiments, one possible implementation of computational node 500 may comprise server 300. In some embodiments, one possible implementation of shared memory access modules 510 may comprise using internal communication modules 440 to send information to shared memory modules 410 and/or receive information from shared memory modules 410. In some embodiments, node registration modules 420 and load balancing modules 430 may be implemented as a combined module.

In some embodiments, the one or more shared memory modules 410 may be accessed by more than one computational node. Therefore, shared memory modules 410 may allow information sharing among two or more computational nodes 500. In some embodiments, the one or more shared memory access modules 510 may be configured to enable access of computational nodes 500 and/or the one or more processing units 220 of computational nodes 500 to shared memory modules 410. In some examples, computational nodes 500 and/or the one or more processing units 220 of computational nodes 500, may access shared memory modules 410, for example using shared memory access modules 510, in order to perform at least one of: executing software programs stored on shared memory modules 410, store information in shared memory modules 410, retrieve information from the shared memory modules 410.

In some embodiments, the one or more node registration modules 420 may be configured to track the availability of the computational nodes 500. In some examples, node registration modules 420 may be implemented as: a software program, such as a software program executed by one or more of the computational nodes 500; a hardware solution; a combined software and hardware solution; and so forth. In some implementations, node registration modules 420 may communicate with computational nodes 500, for example using internal communication modules 440. In some examples, computational nodes 500 may notify node registration modules 420 of their status, for example by sending messages: at computational node 500 startup; at computational node 500 shutdown; at constant intervals; at selected times; in response to queries received from node registration modules 420; and so forth. In some examples, node registration modules 420 may query about computational nodes 500 status, for example by sending messages: at node registration module 420 startup; at constant intervals; at selected times; and so forth.

In some embodiments, the one or more load balancing modules 430 may be configured to divide the work load among computational nodes 500. In some examples, load balancing modules 430 may be implemented as: a software program, such as a software program executed by one or more of the computational nodes 500; a hardware solution; a combined software and hardware solution; and so forth. In some implementations, load balancing modules 430 may interact with node registration modules 420 in order to obtain information regarding the availability of the computational nodes 500. In some implementations, load balancing modules 430 may communicate with computational nodes 500, for example using internal communication modules 440. In some examples, computational nodes 500 may notify load balancing modules 430 of their status, for example by sending messages: at computational node 500 startup; at computational node 500 shutdown; at constant intervals; at selected times; in response to queries received from load balancing modules 430; and so forth. In some examples, load balancing modules 430 may query about computational nodes 500 status, for example by sending messages: at load balancing module 430 startup; at constant intervals; at selected times; and so forth.

In some embodiments, the one or more internal communication modules 440 may be configured to receive information from one or more components of cloud platform 400, and/or to transmit information to one or more components of cloud platform 400. For example, control signals and/or synchronization signals may be sent and/or received through internal communication modules 440. In another example, input information for computer programs, output information of computer programs, and/or intermediate information of computer programs, may be sent and/or received through internal communication modules 440. In another example, information received though internal communication modules 440 may be stored in memory units 210, in shared memory units 410, and so forth. In an additional example, information retrieved from memory units 210 and/or shared memory units 410 may be transmitted using internal communication modules 440. In another example, input data may be transmitted and/or received using internal communication modules 440. Examples of such input data may include input data inputted by a user using user input devices.

In some embodiments, the one or more external communication modules 450 may be configured to receive and/or to transmit information. For example, control signals may be sent and/or received through external communication modules 450. In another example, information received though external communication modules 450 may be stored in memory units 210, in shared memory units 410, and so forth. In an additional example, information retrieved from memory units 210 and/or shared memory units 410 may be transmitted using external communication modules 450. In another example, input data may be transmitted and/or received using external communication modules 450. Examples of such input data may include: input data inputted by a user using user input devices; information captured from the environment of apparatus 200 using one or more sensors; and so forth. Examples of such sensors may include: audio sensors 250; image sensors 260; motion sensors 270; positioning sensors 275; chemical sensors 280; temperature sensors 285; barometers; pressure sensors; proximity sensors; electrical impedance sensors; electrical voltage sensors; electrical current sensors; and so forth.

Figure 6A:
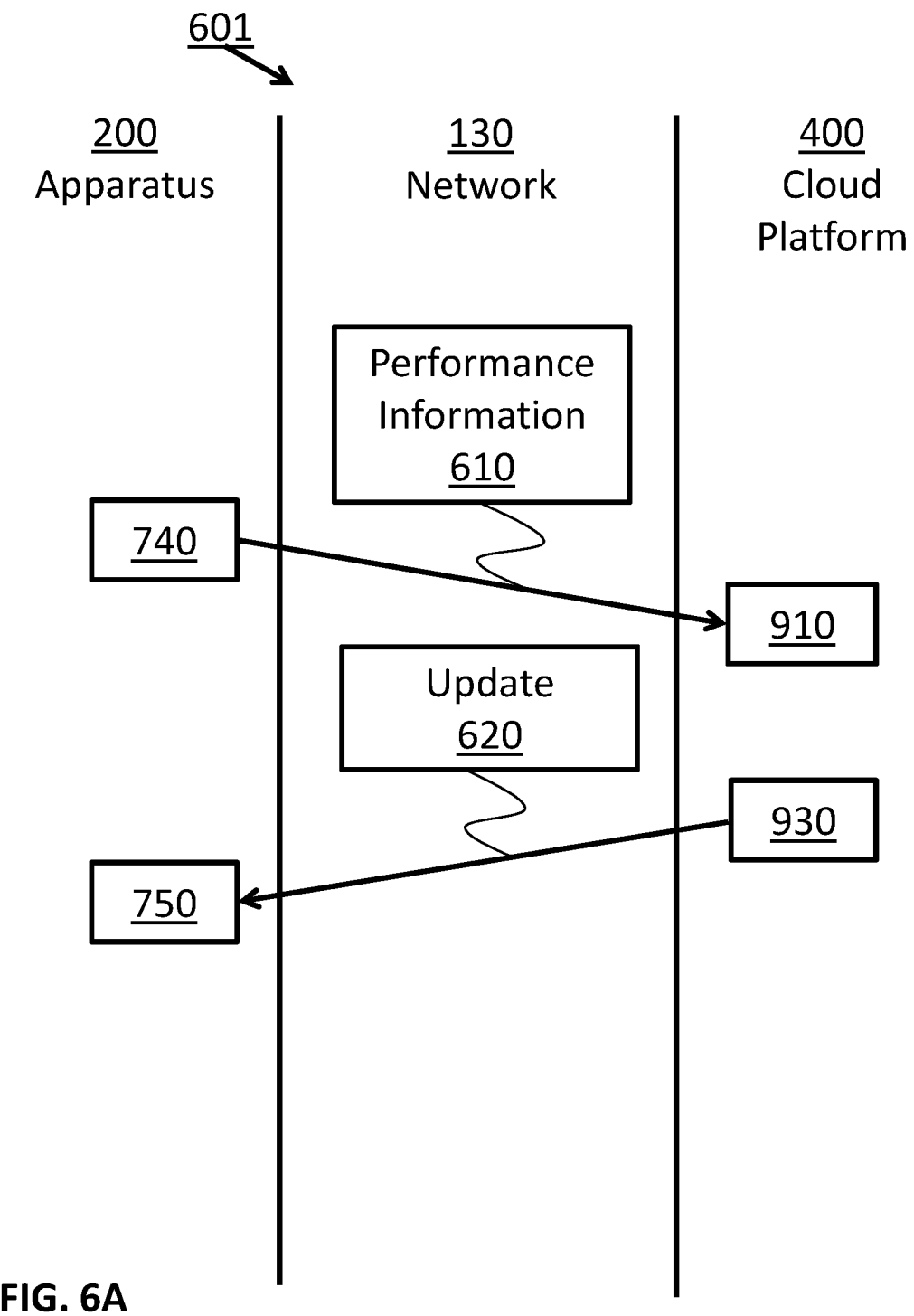
FIGS. 6A, 6B, 6C, 6D and 6E illustrate some possible communication flows.

FIG. 6A illustrates a possible communication flow 601. Communication flow 601 will be described with reference to cloud platform 400 for exemplary purposes only, and it should be understood that communication flow 601 could be applied equally to any suitable computational device incorporating a processing unit and a communication module. Other examples of such suitable computational devices may include: server 300, computational node 500, and so forth. Communication flow 601 herein will be described with reference to network 130 for exemplary purposes only, and it should be understood that communication flow 601 could be applied equally using any means that enable communication between two or more computational devices, such as apparatus 200 and cloud platform 400. In this example, apparatus 200 communicates with cloud platform 400 through communication network 130. For example, apparatus 200 may use communication modules 230 to communicate with external communication modules 450 of cloud platform 400. In this example of communication flow 601, apparatus 200 may transmit performance information 610 to cloud platform 400 (Step 740, described below), and cloud platform 400 may receive performance information 610 (Step 910, described below). In this example of communication flow 601, cloud platform 400 may generate one or more updates 620 (for example, by Step 920 described below). In some examples, updates 620 may be based, at least in part, on performance information 610. In this example of communication flow 601, cloud platform 400 may transmit updates 620 to apparatus 200 (Step 930, described below), and apparatus 200 may receive updates 620 (Step 750, described below).

Figure 6B:
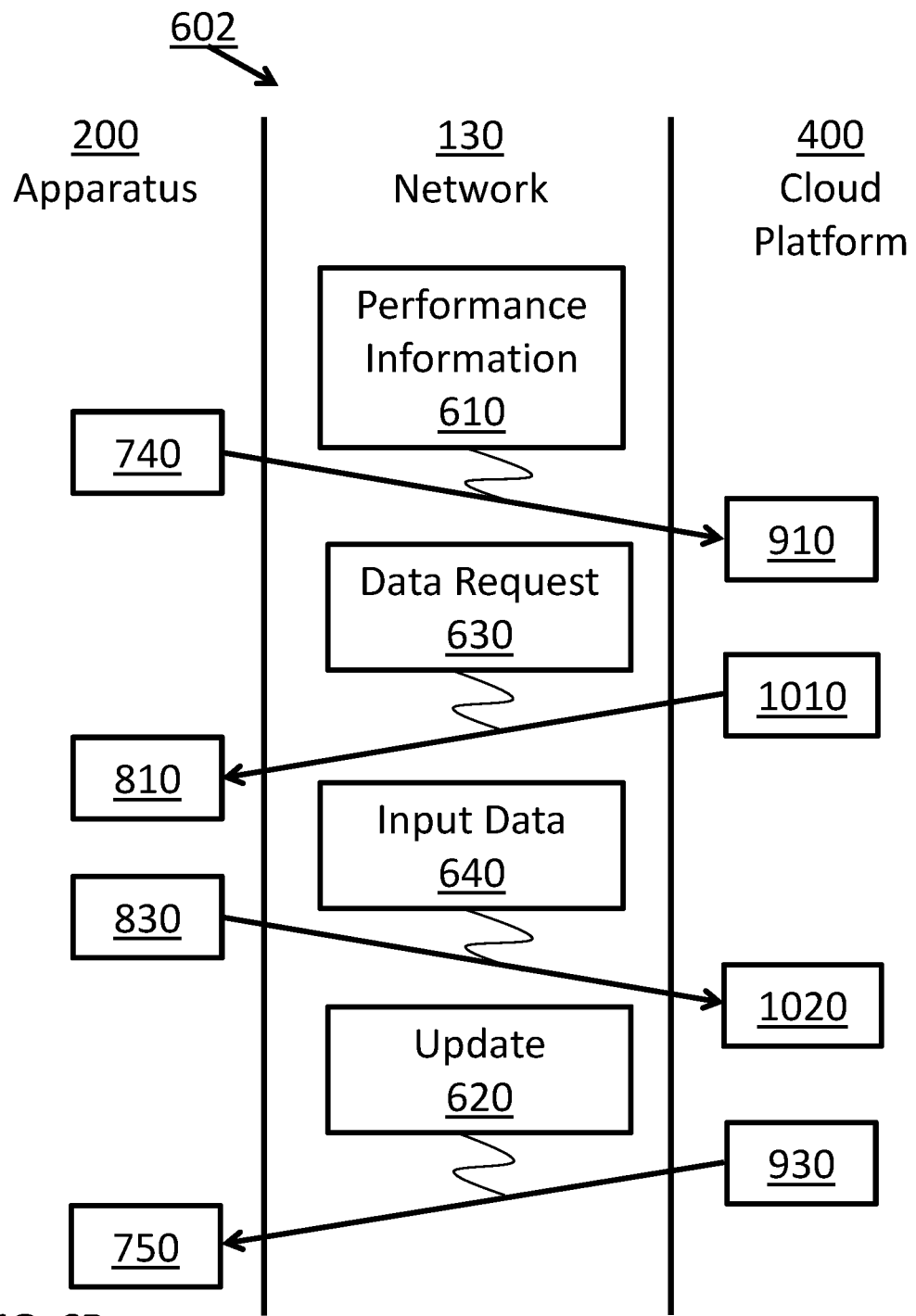

FIG. 6B illustrates a possible communication flow 602. Communication flow 602 herein will be described with reference to cloud platform 400 for exemplary purposes only, and it should be understood that communication flow 602 could be applied equally to any suitable computational device incorporating a processing unit and a communication module. Other examples of such suitable computational devices may include: server 300, computational node 500, and so forth. Communication flow 602 herein will be described with reference to network 130 for exemplary purposes only, and it should be understood that communication flow 602 could be applied equally using any means that enable communication between two or more computational devices, such as apparatus 200 and cloud platform 400. In this example, apparatus 200 communicates with cloud platform 400 through communication network 130. For example, apparatus 200 may use communication modules 230 to communicate with external communication modules 450 of cloud platform 400. In this example of communication flow 602, apparatus 200 may transmit performance information 610 to cloud platform 400 (Step 740, described below), and cloud platform 400 may receive performance information 610 (Step 910, described below). In this example of communication flow 602, cloud platform 400 may transmit one or more data requests 630 to apparatus 200 (Step 1010, described below), and apparatus 200 may receive data requests 630 (Step 810, described below). In some examples, data requests 630 may be based, at least in part, on performance information 610. In this example of communication flow 602, apparatus 200 may transmit at least part of input data 640 to cloud platform 400 (Step 830, described below), and cloud platform 400 may receive the at least part of input data 640 (Step 1020, described below). In some examples, apparatus 200 may select the at least part of input data 640 from the input data based, at least in part, on data requests 630, on the input data, on performance information 610, and so forth (for example, by step 820 described below). In this example of communication flow 602, cloud platform 400 may generate one or more updates 620 (for example, by Step 920 described below). In some examples, updates 620 may be based, at least in part, on performance information 610 and/or on the at least part of input data 640. In this example of communication flow 602, cloud platform 400 may transmit updates 620 to apparatus 200 (Step 930, described below), and apparatus 200 may receive updates 620 (Step 750, described below).

Figure 6C:
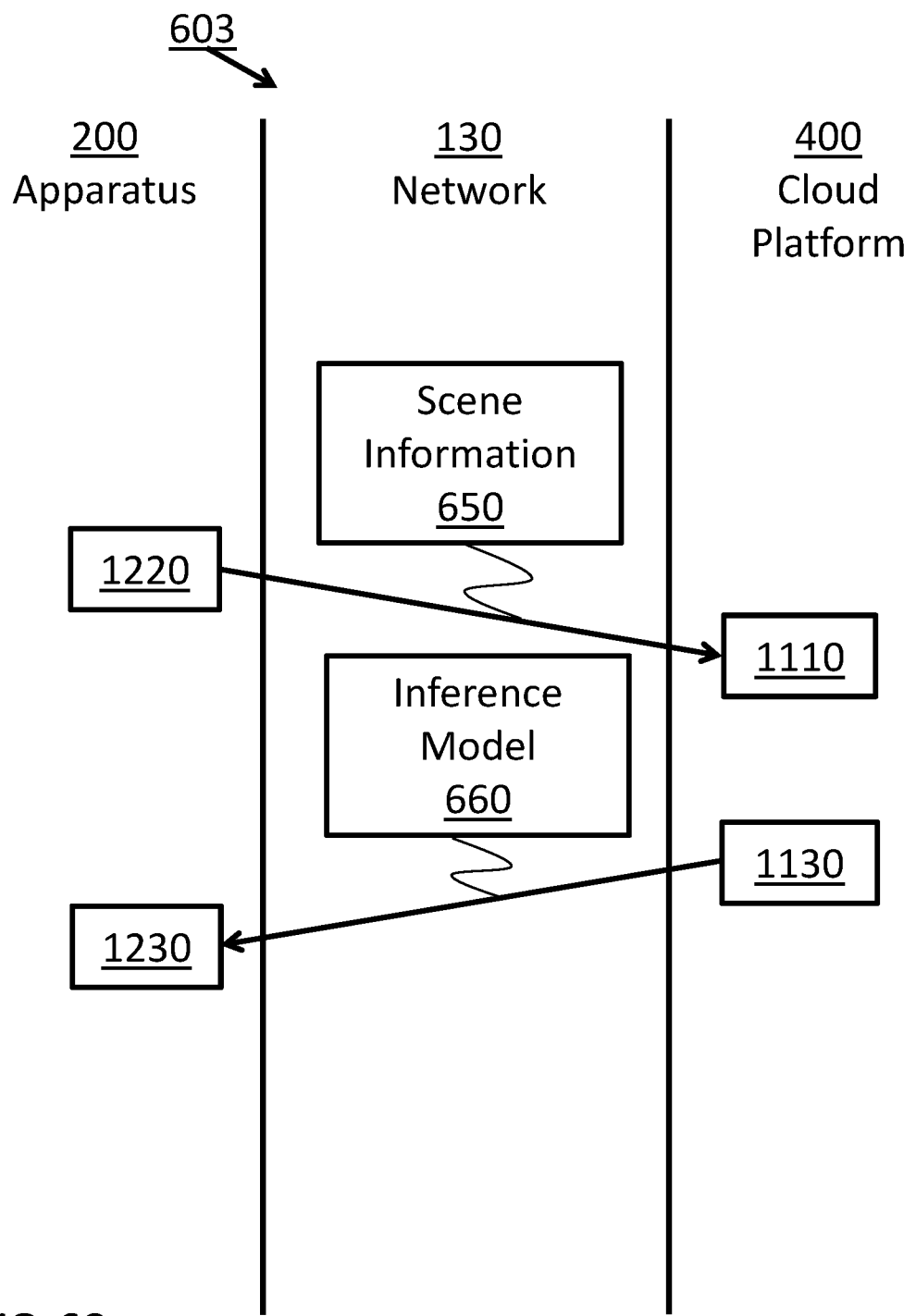

FIG. 6C illustrates a possible communication flow 603. Communication flow 603 will be described with reference to cloud platform 400 for exemplary purposes only, and it should be understood that communication flow 603 could be applied equally to any suitable computational device incorporating a processing unit and a communication module. Other examples of such suitable computational devices may include: server 300, computational node 500, and so forth. Communication flow 603 herein will be described with reference to network 130 for exemplary purposes only, and it should be understood that communication flow 603 could be applied equally using any means that enable communication between two or more computational devices, such as apparatus 200 and cloud platform 400. In this example, apparatus 200 communicates with cloud platform 400 through communication network 130. For example, apparatus 200 may use communication modules 230 to communicate with external communication modules 450 of cloud platform 400. In this example of communication flow 603, apparatus 200 may transmit scene information 650 to cloud platform 400 (Step 1220, described below), and cloud platform 400 may receive scene information 650 (Step 1110, described below). In this example of communication flow 603, cloud platform 400 may generate one or more inference models 660 (for example, by Step 1120 described below). In some examples, one or more inference models 660 may be based, at least in part, on scene information 650. In this example of communication flow 603, cloud platform 400 may transmit at least one of the one or more inference models 660 to apparatus 200 (Step 1130, described below), and apparatus 200 may receive the at least one of the one or more inference models 660 (Step 1230, described below).

Figure 6D:
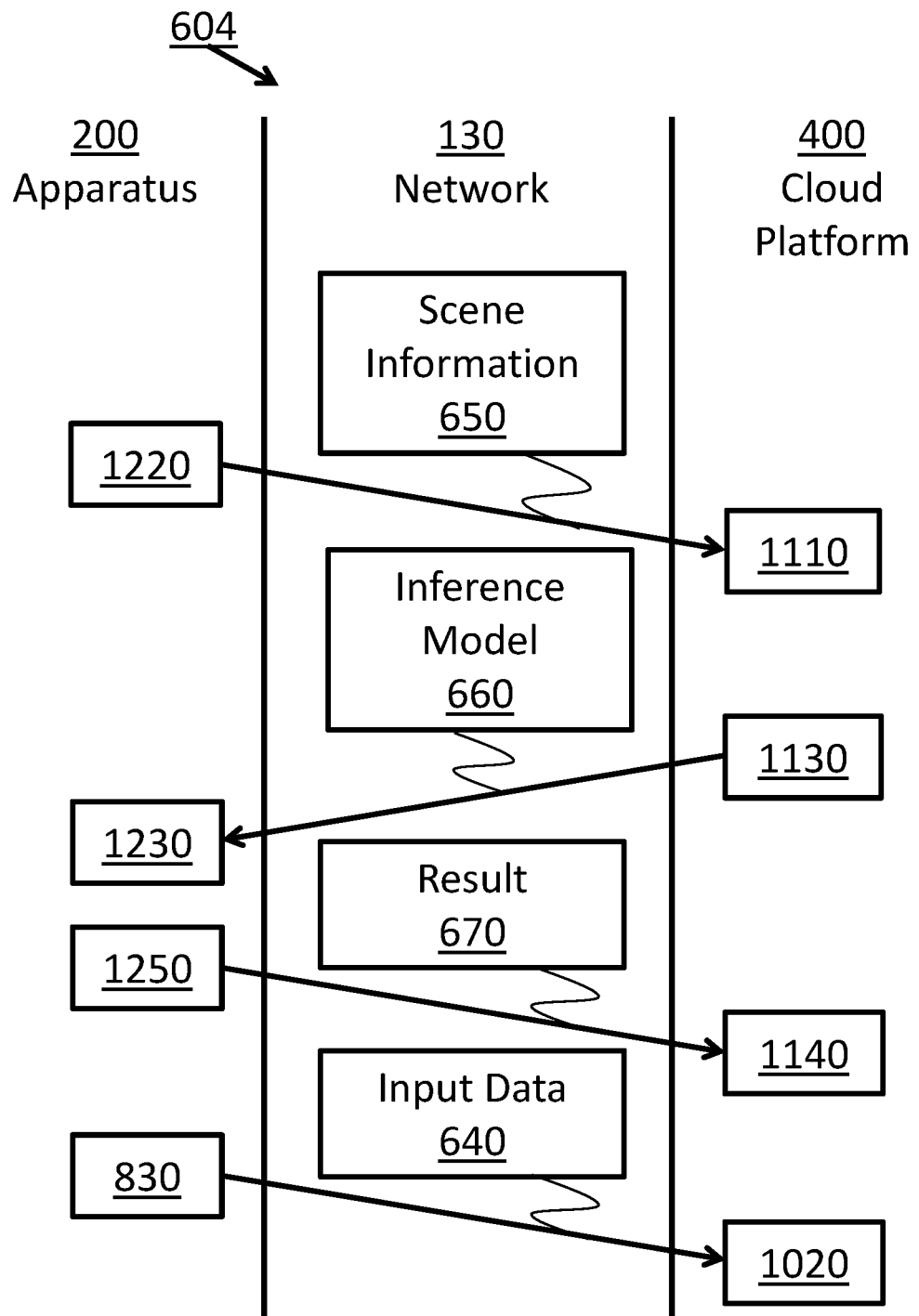

FIG. 6D illustrates a possible communication flow 604. Communication flow 604 will be described with reference to cloud platform 400 for exemplary purposes only, and it should be understood that communication flow 604 could be applied equally to any suitable computational device incorporating a processing unit and a communication module. Other examples of such suitable computational devices may include: server 300, computational node 500, and so forth. Communication flow 604 herein will be described with reference to network 130 for exemplary purposes only, and it should be understood that communication flow 604 could be applied equally using any means that enable communication between two or more computational devices, such as apparatus 200 and cloud platform 400. In this example, apparatus 200 communicates with cloud platform 400 through communication network 130. For example, apparatus 200 may use communication modules 230 to communicate with external communication modules 450 of cloud platform 400. In this example of communication flow 604, apparatus 200 may transmit scene information 650 to cloud platform 400 (Step 1220, described below), and cloud platform 400 may receive scene information 650 (Step 1110, described below). In this example of communication flow 604, cloud platform 400 may generate one or more inference models 660 (for example, by Step 1120 described below). In some examples, one or more inference models 660 may be based, at least in part, on scene information 650. In this example of communication flow 604, cloud platform 400 may transmit at least one of the one or more inference models 660 to apparatus 200 (Step 1130, described below), and apparatus 200 may receive the at least one of the one or more inference models 660 (Step 1230, described below). In this example of communication flow 604, apparatus may generate one or more results 670 (for example, by Step 730 described below). In some examples, one or more results 670 may be based, at least in part, on scene information 650, on input data 640, on the at least one of the one or more inference models 660, and so forth. In this example of communication flow 604, apparatus 200 may transmit one or more results 670 to cloud platform 400 (Step 1250, described below), and cloud platform 400 may receive one or more results 670 (Step 1140, described below). In this example of communication flow 604, apparatus 200 may transmit at least part of input data 640 to cloud platform 400 (Step 830, described below), and cloud platform 400 may receive the at least part of input data 640 (Step 1020, described below). In some examples, apparatus 200 may select the at least part of input data 640 from the input data based, at least in part, scene information 650, on input data 640, on the at least one of the one or more inference models 660, on results 670, and so forth (for example, by step 820 described below).

Figure 6E:
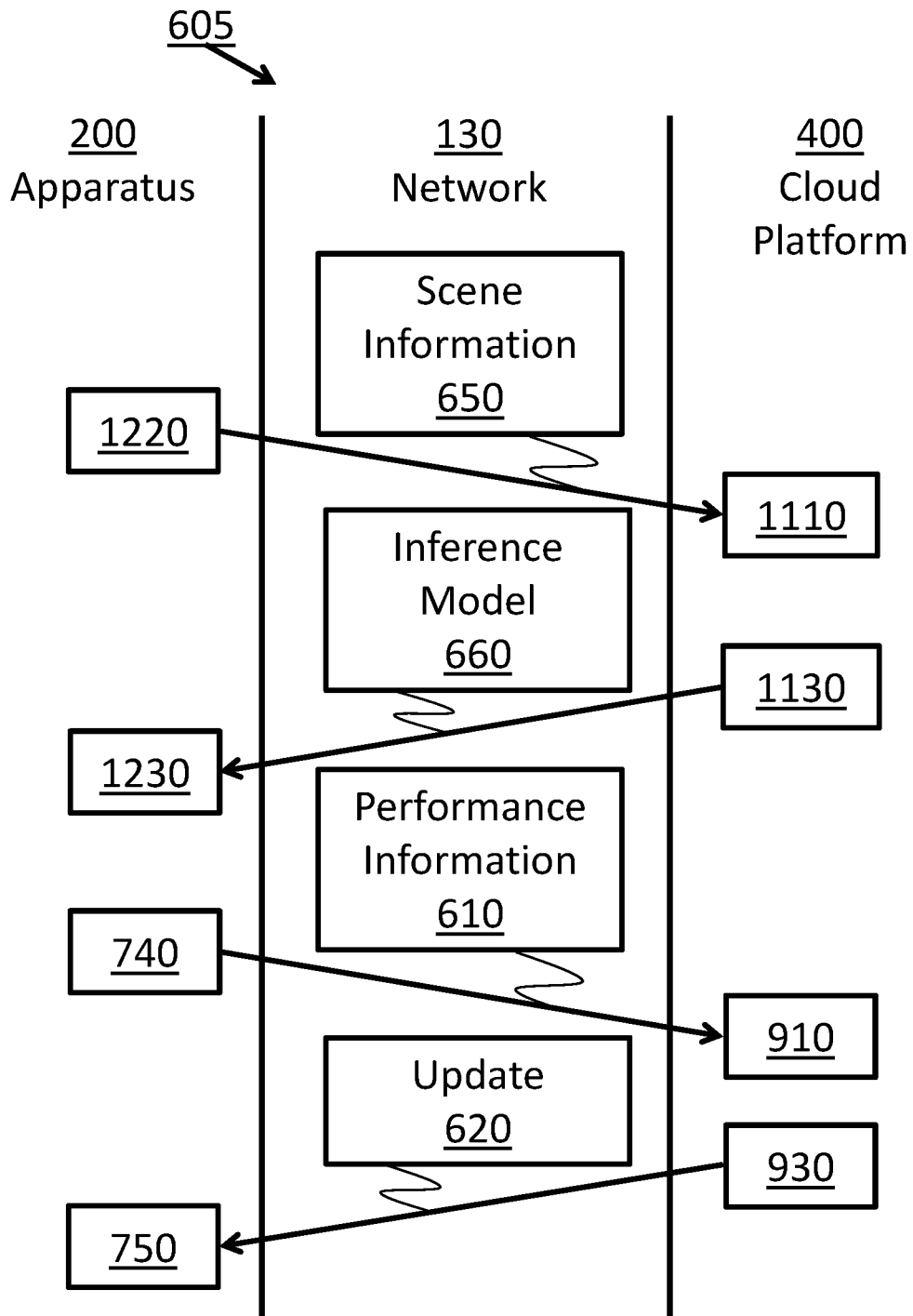

FIG. 6E illustrates a possible communication flow 605. Communication flow 605 will be described with reference to cloud platform 400 for exemplary purposes only, and it should be understood that communication flow 605 could be applied equally to any suitable computational device incorporating a processing unit and a communication module. Other examples of such suitable computational devices may include: server 300, computational node 500, and so forth. Communication flow 605 herein will be described with reference to network 130 for exemplary purposes only, and it should be understood that communication flow 605 could be applied equally using any means that enable communication between two or more computational devices, such as apparatus 200 and cloud platform 400. In this example, apparatus 200 communicates with cloud platform 400 through communication network 130. For example, apparatus 200 may use communication modules 230 to communicate with external communication modules 450 of cloud platform 400. In this example of communication flow 605, apparatus 200 may transmit scene information 650 to cloud platform 400 (Step 1220, described below), and cloud platform 400 may receive scene information 650 (Step 1110, described below). In this example of communication flow 605, cloud platform 400 may generate one or more inference models 660 (for example, by Step 1120 described below). In some examples, one or more inference models 660 may be based, at least in part, on scene information 650. In this example of communication flow 605, cloud platform 400 may transmit at least one of the one or more inference models 660 to apparatus 200 (Step 1130, described below), and apparatus 200 may receive the at least one of the one or more inference models 660 (Step 1230, described below). In this example of communication flow 605, apparatus 200 may transmit performance information 610 to cloud platform 400 (Step 740, described below), and cloud platform 400 may receive performance information 610 (Step 910, described below). In this example of communication flow 605, cloud platform 400 may generate one or more updates 620 (for example, by Step 920 described below). In some examples, updates 620 may be based, at least in part, on performance information 610, on scene information 650, on inference models 660, and so forth. In this example of communication flow 605, cloud platform 400 may transmit updates 620 to apparatus 200 (Step 930, described below), and apparatus 200 may receive updates 620 (Step 750, described below).

Figure 7:
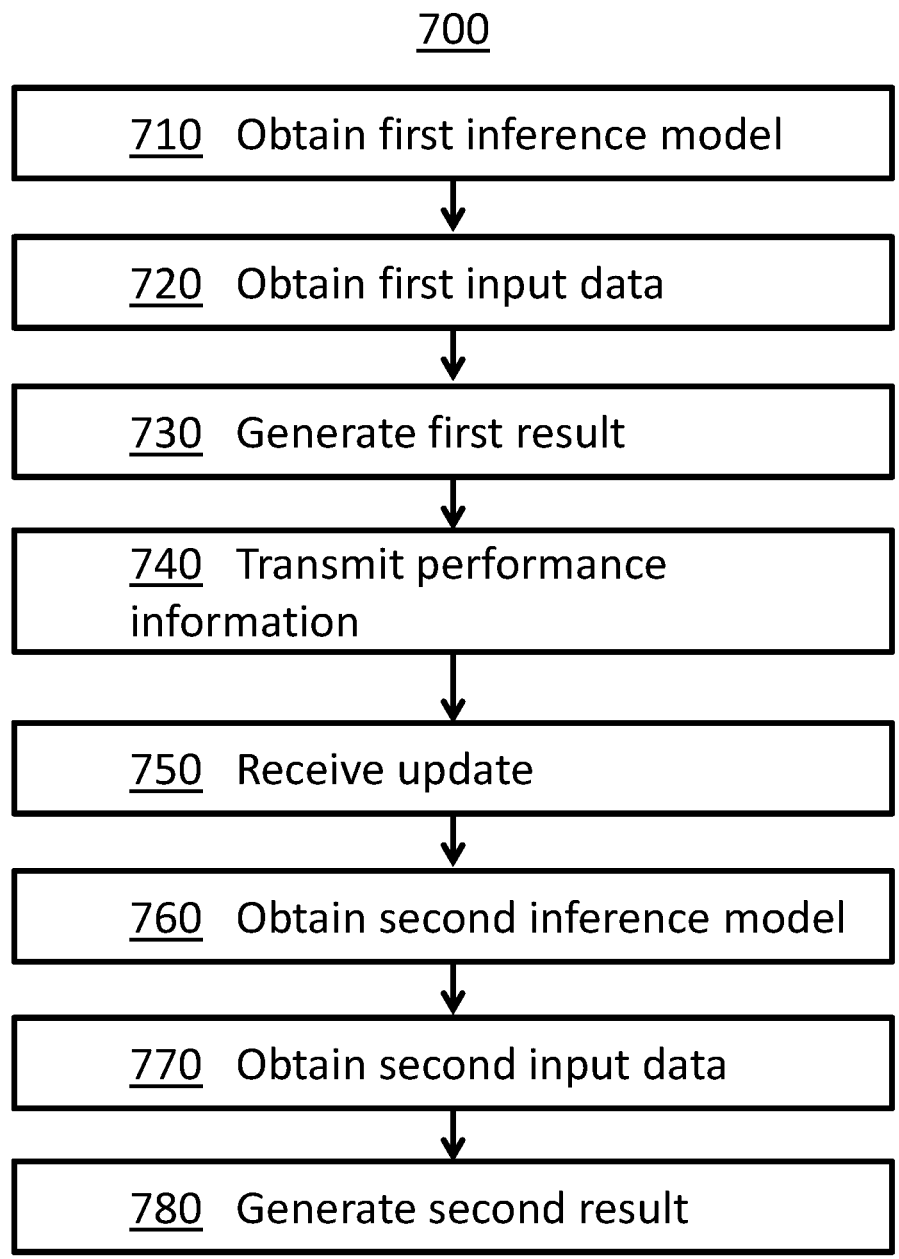
FIG. 7 illustrates an example of a process for inferring information.

FIG. 7 illustrates an example of a process 700 for inferring information. In some examples, process 700, as well as all individual steps therein, may be performed by various aspects of: apparatus 200; server 300; cloud platform 400; computational node 500; and so forth. For example, process 700 may be performed by processing units 220, executing software instructions stored within memory units 210 and/or within shared memory modules 410. In this example, process 700 may comprise: obtaining a first inference model (Step 710); obtaining first input data (Step 720); generating a first result (Step 730); transmitting performance information (Step 740); receiving an update (Step 750); obtaining a second inference model (Step 760); obtaining second input data (Step 770); and generating a second result (Step 780). In some implementations, process 700 may comprise one or more additional steps, while some of the steps listed above may be modified or excluded. In some implementations, one or more steps illustrated in FIG. 7 may be executed in a different order and/or one or more groups of steps may be executed simultaneously and vice versa. For example: Step 720 may be executed before, after and/or simultaneously with Step 710; Step 770 may be executed before, after, and/or simultaneously with Step 760; and so forth. Examples of possible execution manners of process 700 may include: continuous execution, returning to the beginning of the process once the process normal execution ends; periodically execution, executing the process at selected times; execution upon the detection of a trigger, where examples of such trigger may include trigger from a user, trigger from another process, etc.; any combination of the above; and so forth.

Figure 8:
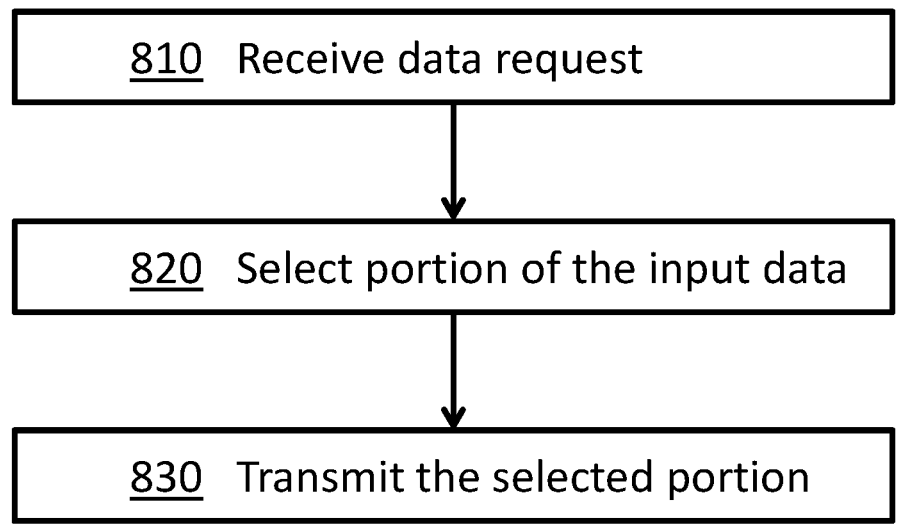
FIG. 8 illustrates an example of a process for transmitting input data.

FIG. 8 illustrates an example of a process 800 for inferring information. In some examples, process 800, as well as all individual steps therein, may be performed by various aspects of: apparatus 200; server 300; cloud platform 400; computational node 500; and so forth. For example, process 800 may be performed by processing units 220, executing software instructions stored within memory units 210 and/or within shared memory modules 410. In this example, process 800 may comprise: receiving a data request (Step 810); selecting a portion of the input data (Step 820); and transmitting the selected portion of the input data (Step 830). In some implementations, process 800 may comprise one or more additional steps, while some of the steps listed above may be modified or excluded. In some implementations, one or more steps illustrated in FIG. 8 may be executed in a different order and/or one or more groups of steps may be executed simultaneously and vice versa. Examples of possible execution manners of process 800 may include: continuous execution, returning to the beginning of the process once the process normal execution ends; periodically execution, executing the process at selected times; execution upon the detection of a trigger, where examples of such trigger may include trigger from a user, trigger from another process, etc.; any combination of the above; and so forth.

Figure 9:
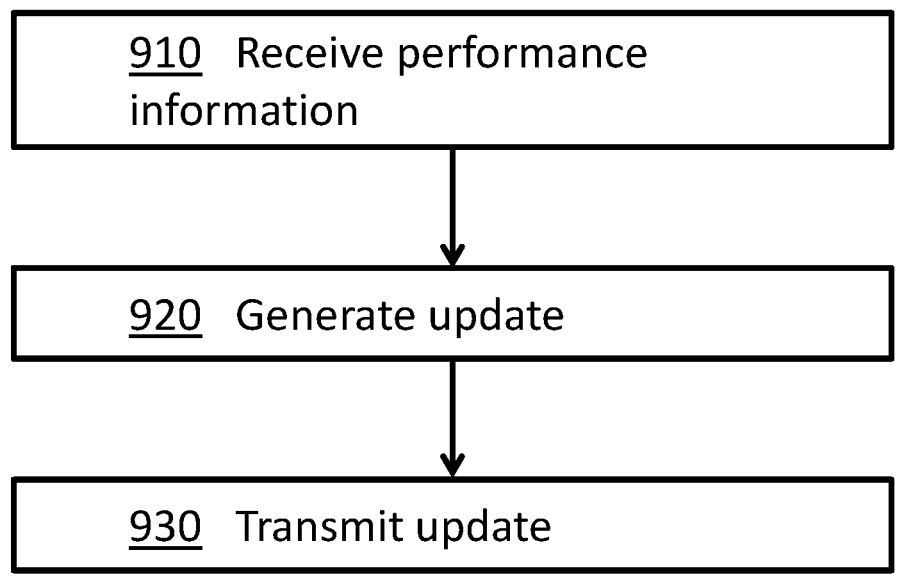
FIG. 9 illustrates an example of a process for generating inference models.

FIG. 9 illustrates an example of a process 900 for inferring information. In some examples, process 900, as well as all individual steps therein, may be performed by various aspects of: apparatus 200; server 300; cloud platform 400; computational node 500; and so forth. For example, process 900 may be performed by processing units 220, executing software instructions stored within memory units 210 and/or within shared memory modules 410. In this example, process 900 may comprise: receiving performance information (Step 910); generating an update (Step 920); and transmitting the update (Step 930). In some implementations, process 900 may comprise one or more additional steps, while some of the steps listed above may be modified or excluded. In some implementations, one or more steps illustrated in FIG. 9 may be executed in a different order and/or one or more groups of steps may be executed simultaneously and vice versa. Examples of possible execution manners of process 900 may include: continuous execution, returning to the beginning of the process once the process normal execution ends; periodically execution, executing the process at selected times; execution upon the detection of a trigger, where examples of such trigger may include trigger from a user, trigger from another process, etc.; any combination of the above; and so forth.

Figure 10:
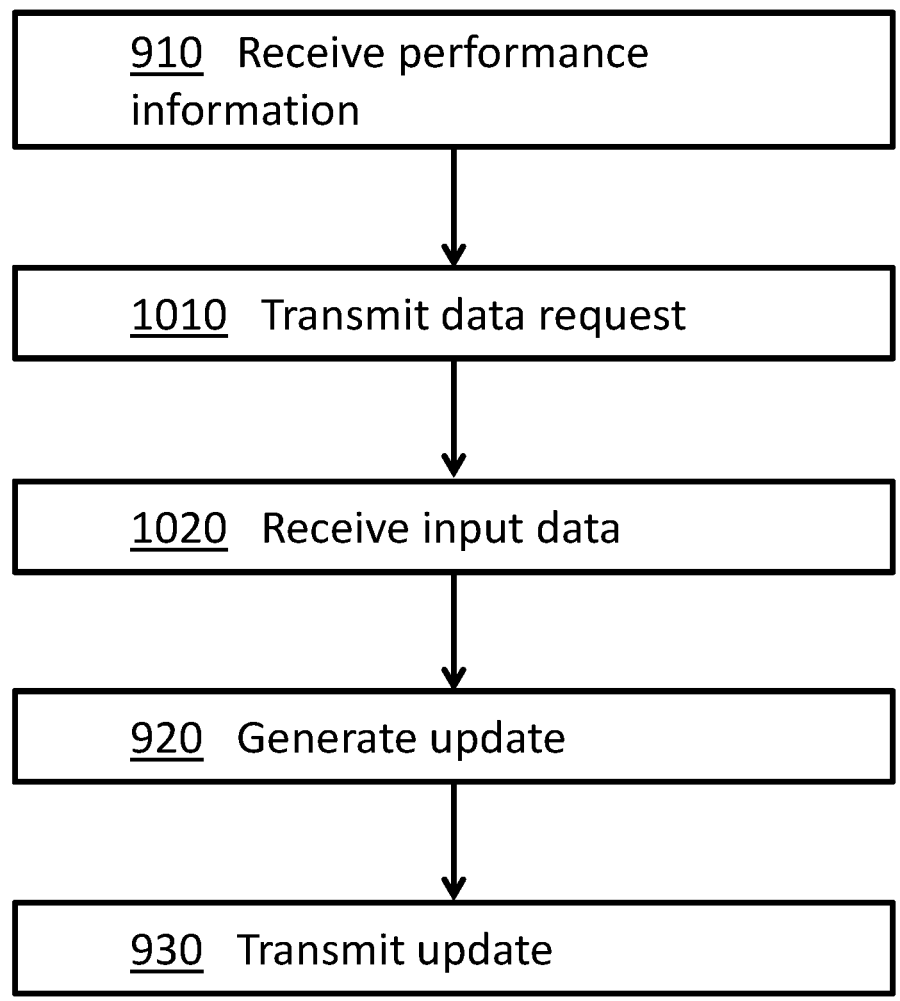
FIG. 10 illustrates an example of a process for generating inference models.

FIG. 10 illustrates an example of a process 1000 for inferring information. In some examples, process 1000, as well as all individual steps therein, may be performed by various aspects of: apparatus 200; server 300; cloud platform 400; computational node 500; and so forth. For example, process 1000 may be performed by processing units 220, executing software instructions stored within memory units 210 and/or within shared memory modules 410. In this example, process 1000 may comprise: receiving performance information (Step 910); transmitting a data request (Step 1010); receiving a portion of the input data (Step 1020); generating an update (Step 920); and transmitting the update (Step 930). In some implementations, process 1000 may comprise one or more additional steps, while some of the steps listed above may be modified or excluded. In some implementations, one or more steps illustrated in FIG. 10 may be executed in a different order and/or one or more groups of steps may be executed simultaneously and vice versa. Examples of possible execution manners of process 1000 may include: continuous execution, returning to the beginning of the process once the process normal execution ends; periodically execution, executing the process at selected times; execution upon the detection of a trigger, where examples of such trigger may include trigger from a user, trigger from another process, etc.; any combination of the above; and so forth.

Figure 11:
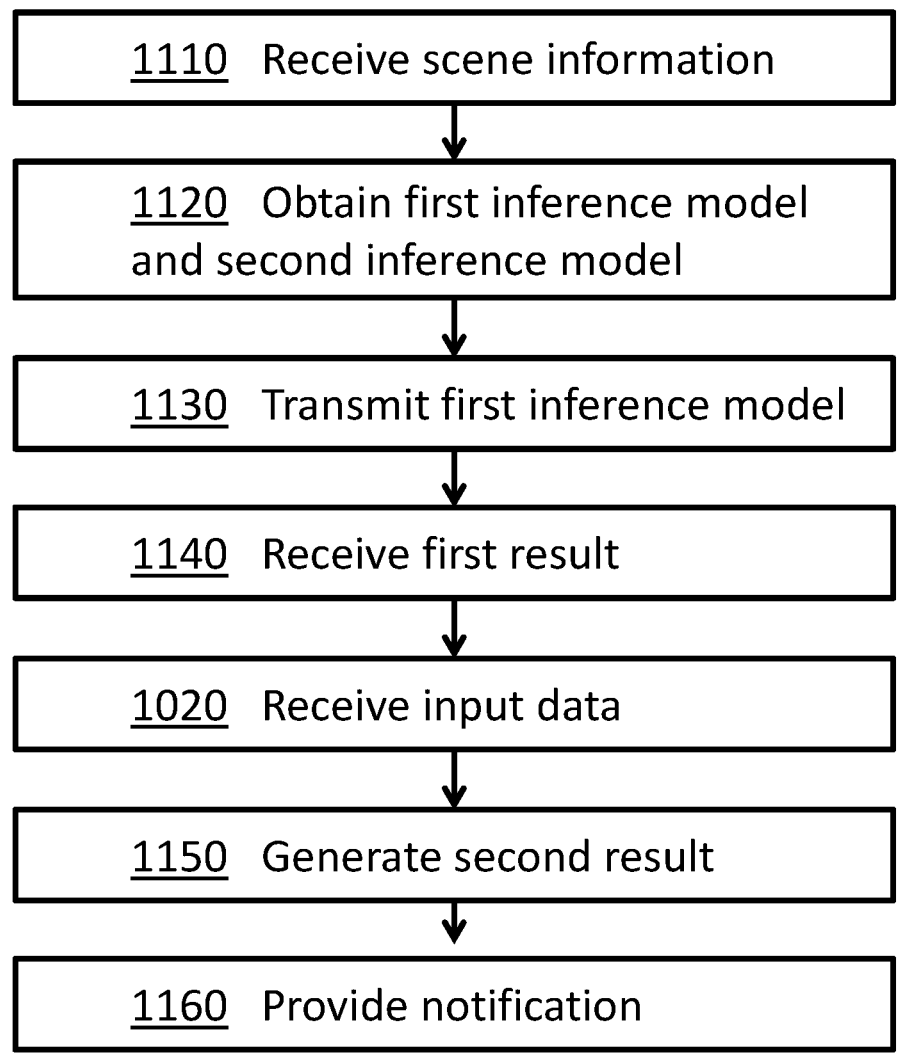
FIG. 11 illustrates an example of a process for providing notifications.

FIG. 11 illustrates an example of a process 1100 for inferring information. In some examples, process 1100, as well as all individual steps therein, may be performed by various aspects of: apparatus 200; server 300; cloud platform 400; computational node 500; and so forth. For example, process 1100 may be performed by processing units 220, executing software instructions stored within memory units 210 and/or within shared memory modules 410. In this example, process 1100 may comprise: receiving scene information (Step 1110); obtaining a first inference model and a second inference model (Step 1120); transmitting the first inference model (Step 1130); receiving a first result (Step 1140); receiving a portion of the input data (Step 1020); generating a second result (Step 1150); and providing a notification (Step 1160). In some implementations, process 1100 may comprise one or more additional steps, while some of the steps listed above may be modified or excluded. For example, in some cases one or more of the following steps may be excluded from process 1100: receiving a first result (Step 1140); receiving a portion of the input data (Step 1020); generating a second result (Step 1150); and providing a notification (Step 1160). In some implementations, one or more steps illustrated in FIG. 11 may be executed in a different order and/or one or more groups of steps may be executed simultaneously and vice versa. For example, Step 1020 may be executed before, after and/or simultaneously with Step 1140, Step 1130, Step 1120, and/or Step 1110. Examples of possible execution manners of process 1100 may include: continuous execution, returning to the beginning of the process once the process normal execution ends; periodically execution, executing the process at selected times; execution upon the detection of a trigger, where examples of such trigger may include trigger from a user, trigger from another process, etc.; any combination of the above; and so forth.

Figure 12:
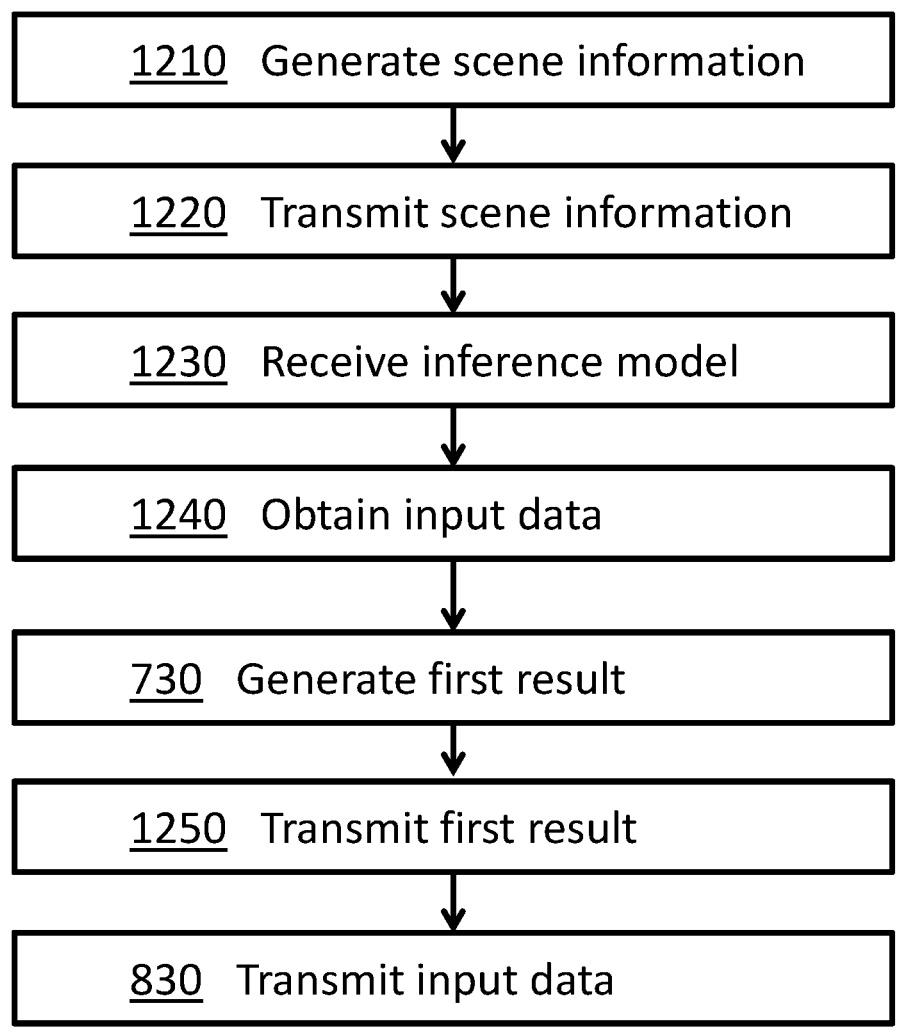
FIG. 12 illustrates an example of a process for inferring information.

FIG. 12 illustrates an example of a process 1200 for inferring information. In some examples, process 1200, as well as all individual steps therein, may be performed by various aspects of: apparatus 200; server 300; cloud platform 400; computational node 500; and so forth. For example, process 1200 may be performed by processing units 220, executing software instructions stored within memory units 210 and/or within shared memory modules 410. In this example, process 1200 may comprise: generating scene information (Step 1210); transmitting the scene information (Step 1220); receiving an inference model (Step 1230); obtaining input data (Step 1240); generating a first result (Step 730); transmitting the first result (Step 1250); and transmitting a portion of the input data (Step 830). In some implementations, process 1200 may comprise one or more additional steps, while some of the steps listed above may be modified or excluded. For example, in some cases one or more of the following steps may be excluded from process 1200: obtaining input data (Step 1240); generating a first result (Step 730); transmitting the first result (Step 1250); and transmitting a portion of the input data (Step 830). In some implementations, one or more steps illustrated in FIG. 12 may be executed in a different order and/or one or more groups of steps may be executed simultaneously and vice versa. For example: Step 1240 may be executed before, after and/or simultaneously with Step 1230, Step 1220, and/or Step 1210; Step 830 may be executed before, after, and/or simultaneously with Step 1250, Step 730, Step, 1230, Step 1220, and/or Step 1210; and so forth. Examples of possible execution manners of process 1200 may include: continuous execution, returning to the beginning of the process once the process normal execution ends; periodically execution, executing the process at selected times; execution upon the detection of a trigger, where examples of such trigger may include trigger from a user, trigger from another process, etc.; any combination of the above; and so forth.

Figure 13:
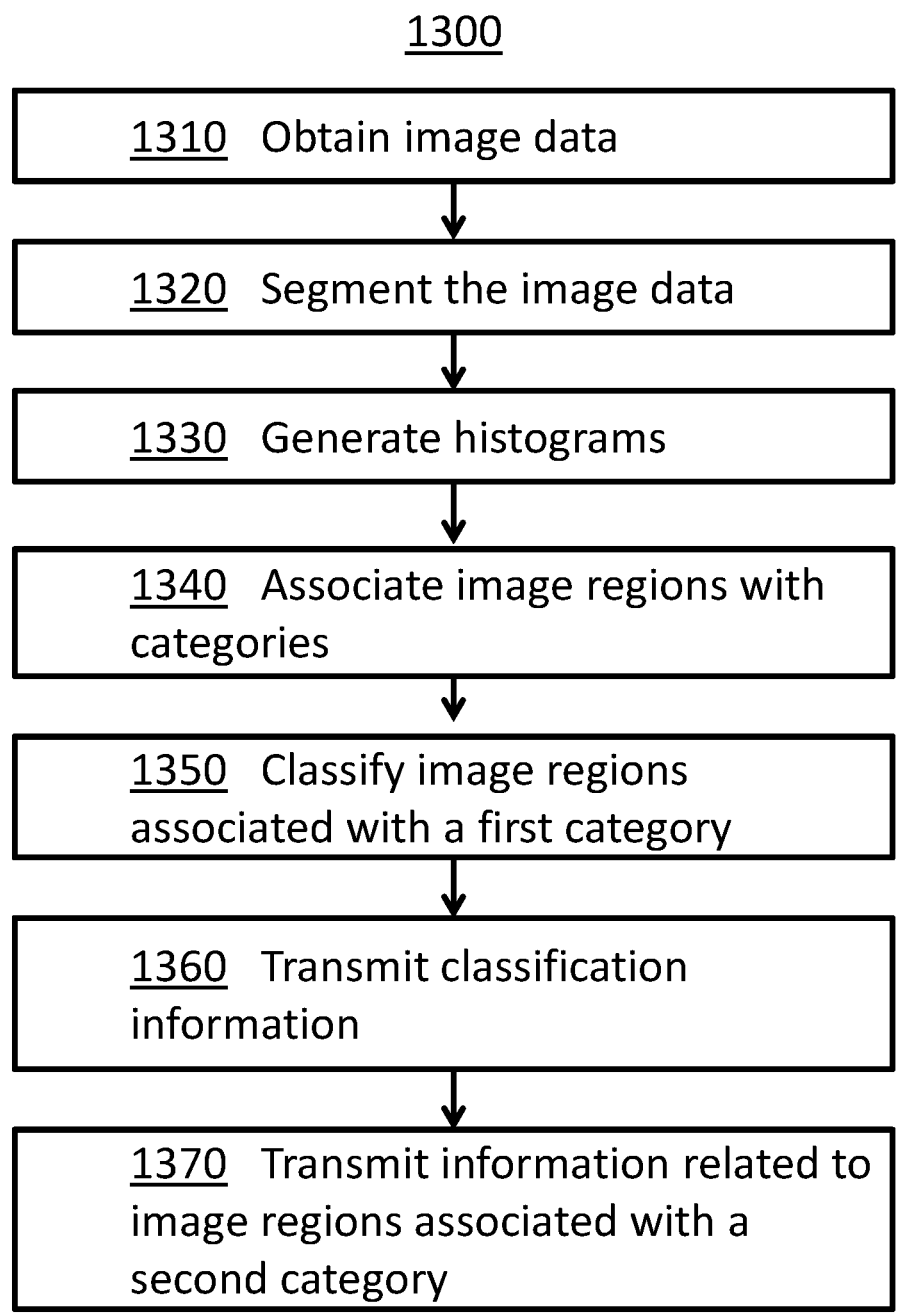
FIG. 13 illustrates an example of a process for classifying image regions.

FIG. 13 illustrates an example of a process 1300 for classifying image regions. In some examples, process 1300, as well as all individual steps therein, may be performed by various aspects of: apparatus 200; server 300; cloud platform 400; computational node 500; and so forth. For example, process 1300 may be performed by processing units 220, executing software instructions stored within memory units 210 and/or within shared memory modules 410. In this example, process 1300 may comprise: obtaining image data (Step 1310); segmenting the image data (Step 1320); generating histograms (Step 1330); associating image regions with categories (Step 1340); classifying image regions associated with a first category (Step 1350); transmitting classification information (Step 1360); and transmitting information related to image regions associated with a second category (Step 1370). In some implementations, process 1300 may comprise one or more additional steps, while some of the steps listed above may be modified or excluded. In some implementations, one or more steps illustrated in FIG. 13 may be executed in a different order and/or one or more groups of steps may be executed simultaneously and vice versa. For example, Step 1370 may be executed before, after and/or simultaneously with Step 1360 and/or Step 1350. Examples of possible execution manners of process 1300 may include: continuous execution, returning to the beginning of the process once the process normal execution ends; periodically execution, executing the process at selected times; execution upon the detection of a trigger, where examples of such trigger may include trigger from a user, trigger from another process, etc.; any combination of the above; and so forth.

Figure 14:
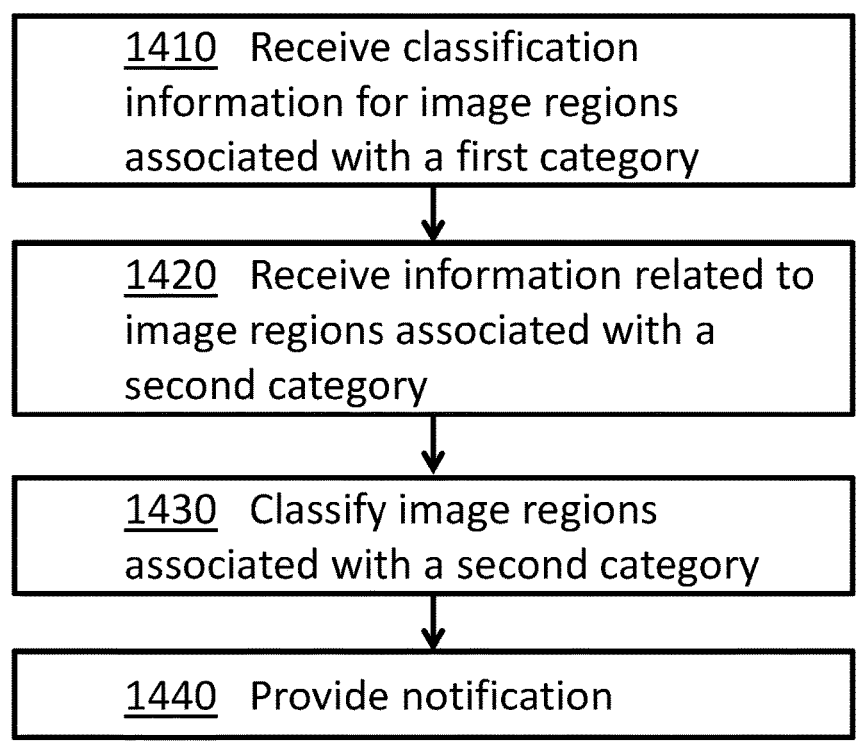
FIG. 14 illustrates an example of a process for classifying image regions and providing notifications.

FIG. 14 illustrates an example of a process 1400 for classifying image regions and providing notifications. In some examples, process 1400, as well as all individual steps therein, may be performed by various aspects of: apparatus 200; server 300; cloud platform 400; computational node 500; and so forth. For example, process 1400 may be performed by processing units 220, executing software instructions stored within memory units 210 and/or within shared memory modules 410. In this example, process 1400 may comprise: receiving classification information (Step 1410); receiving information related to image regions associated with a second category (Step 1420); classifying image regions associated with a second category (Step 1430); and providing a notification (Step 1440). In some implementations, process 1400 may comprise one or more additional steps, while some of the steps listed above may be modified or excluded, such as classifying image regions associated with a second category (Step 1430) and/or providing a notification (Step 1440). In some implementations, one or more steps illustrated in FIG. 14 may be executed in a different order and/or one or more groups of steps may be executed simultaneously and vice versa. For example, Step 1410 may be executed before, after and/or simultaneously with Step 1420. Examples of possible execution manners of process 1400 may include: continuous execution, returning to the beginning of the process once the process normal execution ends; periodically execution, executing the process at selected times; execution upon the detection of a trigger, where examples of such trigger may include trigger from a user, trigger from another process, etc.; any combination of the above; and so forth.

In some embodiments, obtaining first input data (Step 720), obtaining second input data (Step 770), and obtaining input data (Step 1240), may comprise obtaining input data captured using one or more sensors. Examples of such sensors may include: audio sensors 250; image sensors 260; motion sensors 270; positioning sensors 275; chemical sensors 280; temperature sensors 285; barometers; pressure sensors; proximity sensors; electrical impedance sensors; electrical voltage sensors; electrical current sensors; and so forth. In some examples, processing units 220 may control the capturing of the input data using the one or more sensors. In some examples, obtaining the input data captured using one or more sensors may comprise capturing the input data using one or more sensors.

In some examples, obtaining first input data (Step 720), obtaining second input data (Step 770), and obtaining input data (Step 1240), may comprise obtaining input data captured using one or more audio sensors, for example using audio sensors 250. In such cases, the input data may comprise audio data captured using one or more audio sensors, for example using audio sensors 250. Examples of audio data may include: one or more audio recordings; one or more portions of one or more audio recordings; one or more audio streams; one or more portions of one or more audio streams; information based, at least in part, on any of the above; any combination of the above; and so forth.

In some examples, obtaining first input data (Step 720), obtaining second input data (Step 770), obtaining input data (Step 1240), and obtaining image data (Step 1310) may comprise obtaining input data captured using one or more image sensors, for example using image sensors 260. In such cases, the input data may comprise image data captured using one or more image sensors, for example using image sensors 260. Examples of image data may include: one or more images; one or more portions of one or more images; sequence of images; one or more video clips; one or more portions of one or more video clips; one or more video streams; one or more portions of one or more video streams; information based, at least in part, on any of the above; any combination of the above; and so forth.

In some examples, obtaining first input data (Step 720), obtaining second input data (Step 770), and obtaining input data (Step 1240), may comprise obtaining input data captured using one or more motion sensors, for example using motion sensors 270. In such cases, the input data may comprise motion information captured using one or more motion sensors, for example using motion sensors 270. Examples of such motion information may include: indications related to motion of objects; measurements related to the velocity of objects; measurements related to the acceleration of objects; indications related to motion of motion sensor 270; measurements related to the velocity of motion sensor 270; measurements related to the acceleration of motion sensor 270; information based, at least in part, on any of the above; any combination of the above; and so forth.

In some examples, obtaining first input data (Step 720), obtaining second input data (Step 770), and obtaining input data (Step 1240), may comprise obtaining input data captured using one or more positioning sensors, for example using positioning sensors 275. In such cases, the input data may comprise position information captured using one or more positioning sensors, for example using positioning sensors 275. Examples of such position information may include: indications related to the position of positioning sensors 275; indications related to changes in the position of positioning sensors 275; measurements related to the position of positioning sensors 275; indications related to the orientation of positioning sensors 275; indications related to changes in the orientation of positioning sensors 275; measurements related to the orientation of positioning sensors 275; measurements related to changes in the orientation of positioning sensors 275; information based, at least in part, on any of the above; any combination of the above; and so forth.

In some examples, obtaining first input data (Step 720), obtaining second input data (Step 770), and obtaining input data (Step 1240), may comprise obtaining input data captured using one or more chemical sensors, for example using chemical sensors 280. In such cases, the input data may comprise chemical information captured using one or more chemical sensors, for example using chemical sensors 280. Examples of such chemical information may include: measurements related to chemical properties in the environment of chemical sensors 280; measurements related to changes in the chemical properties in the environment of chemical sensors 280; indications related to the present of chemicals in the environment of chemical sensors 280; measurements related to the concentration of chemicals in the environment of chemical sensors 280; information based, at least in part, on any of the above; any combination of the above; and so forth. Some examples of such chemical properties are described above. Some examples of such chemicals are described above.

In some examples, obtaining first input data (Step 720), obtaining second input data (Step 770), and obtaining input data (Step 1240), may comprise obtaining input data captured using one or more temperature sensors, for example using temperature sensors 285. In such cases, the input data may comprise temperature information captured using one or more temperature sensors, for example using temperature sensors 285. Examples of such temperature information may include: indication related to changes in the temperature of the environment of temperature sensors 285; measurements related to changes in the temperature of the environment of temperature sensors 285; indications related to the temperature of the environment of temperature sensors 285; measurements related to the temperature of the environment of temperature sensors 285; information based, at least in part, on any of the above; any combination of the above; and so forth.

In some examples, obtaining first input data (Step 720), obtaining second input data (Step 770), and obtaining input data (Step 1240), may comprise obtaining input data captured using one or more barometers sensors, for example using barometers included in apparatus 200. In such cases, the input data may comprise atmospheric pressure information captured using one or more barometers sensors, for example using barometers included in apparatus 200. Examples of such atmospheric pressure information may include: indications related to changes in the atmospheric pressure; measurements related to changes in the atmospheric pressure; indications related to the atmospheric pressure; measurements related to the atmospheric pressure; information based, at least in part, on any of the above; any combination of the above; and so forth.

In some examples, obtaining first input data (Step 720), obtaining second input data (Step 770), and obtaining input data (Step 1240), may comprise obtaining input data captured using one or more pressure sensors, for example using pressure sensors included in apparatus 200. In such cases, the input data may comprise pressure information captured using one or more pressure sensors, for example using pressure sensors included in apparatus 200. Examples of such pressure information may include: indications related to pressure in the environment of apparatus 200; measurements related to pressure in the environment of apparatus 200; indications related to changes in the pressure in the environment of apparatus 200; measurements related to changes in pressure in the environment of apparatus 200; indications related to pressure at a specific point and/or region of the surface area of apparatus 200; measurements related to pressure at a specific point and/or region of the surface area of apparatus 200; indications related to changes in pressure at a specific point and/or area; measurements related to changes in pressure at a specific point and/or region of the surface area of apparatus 200; measurements related to pressure differences between two specific points and/or regions of the surface area of apparatus 200; measurements related to changes in relative pressure between two specific points and/or regions of the surface area of apparatus 200; information based, at least in part, on any of the above; any combination of the above; and so forth.

In some examples, obtaining first input data (Step 720), obtaining second input data (Step 770), and obtaining input data (Step 1240), may comprise obtaining input data captured using one or more proximity sensors, for example using proximity sensors included in apparatus 200. In such cases, the input data may comprise proximity information captured using one or more proximity sensors, for example using proximity sensors included in apparatus 200. Examples of proximity information may include: indications related to contact of a solid object with the surface of apparatus 200; indications related to contact of a solid object with a specific point and/or region of the surface area of apparatus 200; indications related to a proximity of apparatus 200 to an object; information based, at least in part, on any of the above; any combination of the above; and so forth.

In some examples, obtaining first input data (Step 720), obtaining second input data (Step 770), and obtaining input data (Step 1240), may comprise obtaining input data captured using one or more electrical impedance sensors, for example using electrical impedance sensors included in apparatus 200. In such cases, the input data may comprise electrical impedance information captured using one or more electrical impedance sensors, for example using electrical impedance sensors included in apparatus 200. Examples of such electrical impedance information may include: indications related to changes over time in the connectivity and/or permittivity between two electrodes; measurements related to changes over time in the connectivity and/or permittivity between two electrodes; Electrical Impedance Tomography (EIT) images; information based, at least in part, on any of the above; any combination of the above; and so forth.

In some examples, obtaining first input data (Step 720), obtaining second input data (Step 770), and obtaining input data (Step 1240), may comprise obtaining input data captured using one or more electrical voltage sensors, for example using electrical voltage sensors included in apparatus 200. In such cases, the input data may comprise electrical voltage information captured using one or more electrical voltage sensors, for example using electrical voltage sensors included in apparatus 200. Examples of electrical voltage information may include: indications related to voltage between two electrodes; measurements related to voltage between two electrodes; indications related to changes over time in the voltage between two electrodes; measurements related to changes over time in the voltage between two electrodes; information based, at least in part, on any of the above; any combination of the above; and so forth.

In some examples, obtaining first input data (Step 720), obtaining second input data (Step 770), and obtaining input data (Step 1240), may comprise obtaining input data captured using one or more electrical current sensors, for example using electrical current sensors included in apparatus 200. In such cases, the input data may comprise electrical current information captured using one or more electrical current sensors, for example using electrical current sensors included in apparatus 200. Examples of electrical current information may include: indications related to electrical current flowing between two electrodes; measurements related to electrical current flowing between two electrodes; indications related to changes over time in the electrical current flowing between two electrodes; measurements related to changes over time in the electrical current flowing between two electrodes; information based, at least in part, on any of the above; any combination of the above; and so forth.

In some embodiments, obtaining first input data (Step 720), obtaining second input data (Step 770), and obtaining input data (Step 1240), may comprise obtaining input data from a user using user input devices. Some examples of such user input devices are described above. In such cases, the input data may comprise user input obtained using the user input devices. Some examples of such user input are described above.

In some embodiments, obtaining first input data (Step 720), obtaining second input data (Step 770), and obtaining input data (Step 1240), may comprise receiving input data using one or more communication devices, such as communication modules 230, internal communication modules 440, external communication modules 450, and so forth. Examples of such input data may include: user input obtained using user input devices; input data captured using one or more sensors; and so forth.

In some embodiments, obtaining first input data (Step 720), obtaining second input data (Step 770), and obtaining input data (Step 1240), may comprise reading input data from memory units, such as memory units 210, shared memory modules 410, and so forth. Examples of such input data may include: user input obtained using user input devices; input data captured using one or more sensors; and so forth.

In some embodiments, obtaining a first inference model (Step 710) may comprise receiving at least part of the first inference model using one or more communication devices, such as communication modules 230, internal communication modules 440, external communication modules 450, and so forth. For example, obtaining a first inference model (Step 710) may comprise of Step 1230 (described below). In some embodiments, obtaining a first inference model (Step 710) may comprise reading at least part of the first inference model from memory units, such as memory units 210, shared memory modules 410, and so forth. In some examples, at least part of the first inference model may be preprogrammed manually. In some examples, at least part of the first inference model may be the result of training algorithms, such as machine learning algorithms and/or deep learning algorithms, on training examples. The training examples may include examples of data instances, and in some cases, each data instance may be labeled with a corresponding desired result. In some examples, at least part of the first inference model may be based, at least in part, on the output of one or more neural networks. In some examples, the input data may comprise image data and the first inference model may comprise at least one of: a face detector, a face recognition model, an object detector, a motion detector, an activity detector, a gesture recognition model, an image segmentation model, a video segmentation model, and so forth. In some examples, the input data may comprise audio data and the first inference model may comprise at least one of: a speaker recognition model, a speech recognition model, an audio segmentation model, and so forth. In some examples, the first inference model may comprise at least one of: a classifier, a regression model, a segmentation model, and so forth. In some examples, the first inference model may comprise a combination of a plurality of inference models. For example, the combination of a plurality of inference models may have a hierarchy of interface models, where the activation of one or more inference model is based on the result of another inference model. In another example, combination of a plurality of inference models may work as an ensemble, where the results of two or more inference models are combined together to obtain a combined result, for example using a voting scheme.

In some embodiments, obtaining a first inference model (Step 710) may comprise obtaining the inference model obtained by Step 760 of a previous execution of process 700.

In some embodiments, generating a first result (Step 730), generating a second result (Step 780), and generating a second result (Step 1150) may comprise generating one or more results by applying input data to an inference model, for example by processing units 220. For example, generating a first result (Step 730) in process 700 may comprise generating results by applying input data obtained by Step 720 to inference model obtained by Step 710. For example, generating a first result (Step 730) in process 1200 may comprise generating results by applying input data obtained by Step 1240 to inference model received by Step 1230. For example, generating a second result (Step 780) may comprise generating a result by applying input data obtained by Step 770 to inference model obtained by Step 760. For example, generating a second result (Step 1150) may comprise generating results by applying input data received by Step 1020 to the second inference model obtained by Step 1120. In some examples, the inference model may comprise one or more neural networks, and the results may comprise: at least part of the output of the neural networks; information based, at least in part, on the output of the neural networks; and so forth. In some examples, the inference model may comprise one or more classifiers, and the results may comprise: one or more classifications assigning the input data to one or more classes; one or more classifications assigning one or more portions of the input data to one or more classes; information based, at least in part, on the classifications; and so forth. In some examples, the inference model may comprise one or more regression models, and the results may comprise: one or more values assigned to the input data; one or more values assigned to one or more portions of the input data; information based, at least in part, on the one or more values assigned by the regression models; and so forth. In some examples, the inference model may comprise one or more segmentation models, and the results may comprise information related to one or more segments identified in the input data.

In some examples, the input data may comprise audio data, the inference model may comprise one or more speaker recognition models, and the results may comprise information related to speakers detected in the audio data. Examples of the information related to speakers detected in the audio data may include: information related to the identities of the speakers; information related to the voice of the speakers; information related to the content of the speech associated with the speakers; times at which the speakers were detected; audio segments associated with the speakers; and so forth. In some examples, the input data may comprise audio data, the inference model may comprise one or more speech recognition models, and the results may comprise information related to speech detected in the audio data. Examples of the information related to speech may include: information related to one or more speakers associated with the speech; information related to voice associated with the speech; times associated with the speech; audio segments containing at least part of the speech; the content of the speech, for example in a textual form; summary of the speech; topics discussed in the speech; and so forth. In some examples, the input data may comprise audio data, the inference model may comprise one or more audio segmentation models, and the results may comprise information related to audio segments extracted from the audio data. In some examples, the input data may comprise audio data, the inference model may comprise one or more source separation models, and the results may comprise information related to audio sources identified in the audio data.

In some examples, the input data may comprise image data, the inference model may comprise one or more face detectors, and the results may comprise information related to faces appearing in the image data and detected by the face detectors. Examples of the information related to the detected faces may include: information related to the appearance of the faces; information related to the pose of the faces; information related to facial expressions; image locations at which the faces were detected; times at which the faces were detected; images of the detected faces; and so forth. In some examples, the input data may comprise image data, the inference model may comprise one or more face recognition models, and the results may comprise information related to the identity of people appearing in the image data. In some examples, the input data may comprise image data, the inference model may comprise one or more object detectors, and the results may comprise information related to objects appearing in the image data and detected by the object detectors. Examples of the information related to the detected objects may include: object types; image locations at which the objects were detected; times at which the objects were detected; images of the detected objects; and so forth. In some examples, the input data may comprise image data, the inference model may comprise one or more motion detectors, and the results may comprise information related to motion detected in the image data. In some examples, the input data may comprise image data, the inference model may comprise one or more activity detectors, and the results may comprise information related to activities detected in the image data. In some examples, the input data may comprise image data, the inference model may comprise one or more gesture recognition models, and the results may comprise information related to gestures detected in the image data. In some examples, the input data may comprise image data, the inference model may comprise one or more image segmentation models and/or video segmentation models, and the results may comprise information related to image and/or video segments extracted from the image data.

In some examples, the input data may comprise image data, the inference model may identify one or more pixels and/or voxels, and the results may comprise the identified one or more pixels and/or voxels and/or information related to the identified one or more pixels and/or voxels. In some examples, the input data may comprise image data, the inference model may identify one or more portions and/or regions of the image data, and the results may comprise: the identified one or more portions and/or regions of the image data; information related to the identified one or more portions and/or regions of the image data; and so forth. In some examples, the input data may comprise image data, and the results may comprise an association of values with portions and/or regions of the image data, for example in the form of a mapping that maps portions and/or regions of the image data to values.

In some examples, the input data may comprise information associated with a plurality of locations, the inference model may identify one or more locations based, at least in part, on the information associated with a plurality of locations, and the results may comprise the identified one or more locations and/or information related to the identified one or more locations. In some examples, the input data may comprise information associated with one or more areas, the inference model may identify one or more locations and/or one or more areas based, at least in part, on the associated information, and the results may comprise: the identified one or more location and/or one or more areas; information related to the identified one or more locations and/or one or more areas; and so forth. In some examples, the results may comprise an association of values with locations and/or areas, for example in the form of a mapping that maps locations and/or areas to values.

In some examples, the input data may comprise information associated with a plurality of times, the inference model may identify one or more times based, at least in part, on the information associated with a plurality of times, and the results may comprise the identified one or more times and/or information related to the identified one or more times. In some examples, the input data may comprise information associated with one or more time ranges, the inference model may identify one or more times and/or one or more time ranges based, at least in part, on the associated information, and the results may comprise: the identified one or more times and/or one or more time ranges; information related to the identified one or more times and/or one or more time ranges; and so forth. In some examples, the results may comprise an association of values with times and/or ranges of times, for example in the form of a mapping that maps times and/or ranges of times to values.

In some embodiments, generating a second result (Step 1150) may be based, at least in part, on a first result, for example on a first result received by Step 1140, on a first result generated by Step 730, on a first result generated by process 1200, and so forth. For example, generating a second result (Step 1150) may comprise generating results by applying input data received by Step 1020 to an inference model, and the inference model may be selected of a plurality of inference models, for example of a plurality of inference models obtained by Step 1120, based, at least in part, on the first result. For example, generating a second result (Step 1150) may comprise generating results by applying input data received by Step 1020 to an inference model obtained by Step 1120, where the inference model obtained by Step 1120 comprise at least one parameter, and the at least one parameter may be set based, at least in part, on the first result. For example, generating a second result (Step 1150) may comprise preprocessing input data received by Step 1020 based, at least in part, on the first results, and generating results by applying the preprocessed input data to an inference model obtained by Step 1120.

In some embodiments, one or more results 670 may comprise information related to results generated by Step 730 (generating a first result) of process 1200, for example by applying input data obtained by Step 1240 to inference model received by Step 1230.

In some embodiments, receiving a first result (Step 1140) may comprise receiving results 670 using one or more communication devices, such as communication modules 230, internal communication modules 440, external communication modules 450, and so forth.

In some embodiments, transmitting the first result (Step 1250) may comprise transmitting results 670 using one or more communication devices, such as communication modules 230, internal communication modules 440, external communication modules 450, and so forth.

In some embodiments, performance information 610 may be based, at least in part, on one or more results of applying input data to an inference model, for example on the results obtained by Step 730. In some examples, performance information 610 may comprise at least part of the results. In some embodiments, performance information 610 may be based, at least in part, on input data, for example the input data obtained by Step 720. In some embodiments, performance information 610 may comprise at least part of the input data. For example, performance information 610 may comprise at least part of the input data that was obtained by Step 720. In some cases, a portion of the input data may be selected based, at least in part, on results obtained by Step 730, and performance information 610 may comprise the selected portion of the input data. In some embodiments, performance information 610 may comprise information related to the execution of: Step 710, Step 720, Step 730, any part of the above steps, any combination of the above, and so forth. For example, performance information 610 may comprise the running time of: Step 710; Step 720; Step 730; any part of the above steps; any combination of the above; and so forth. For example, performance information 610 may comprise the memory usage of: Step 710, Step 720, Step 730, any part of the above steps, any combination of the above, and so forth. In another example, performance information 610 may comprise the settings of one or more sensors used by Step 720 to obtain the input data.

In some embodiments, results and confidence levels may be obtained by applying input data to inference model, for example by Step 730 which may comprise generating results and confidence levels by applying input data obtained by Step 720 to inference model obtained by Step 710. In some examples, performance information 610 may comprise at least part of the confidence levels. In some examples, a decision regarding the content of performance information 610 may be based, at least in part, on the results and/or on the confidence levels. For example, the confidence level may be compared with one or more threshold, where in some examples the thresholds may depend on the results, and the content of performance information 610 may depend on the comparison result.

In some embodiments, transmitting performance information (Step 740) may comprise transmitting performance information 610 using one or more communication devices, such as communication modules 230, internal communication modules 440, external communication modules 450, and so forth.

In some embodiments, receiving performance information (Step 910) may comprise receiving performance information 610 using one or more communication devices, such as communication modules 230, internal communication modules 440, external communication modules 450, and so forth.

In some embodiments, one or more data requests 630 may indicate a request to provide information. In some examples, data requests 630 may indicate a request to provide information to at least one of: apparatus 200, server 300, cloud platform 400, computational node 500, process 1000, and so forth. In some examples, data requests 630 may indicate a request to apparatus 200, server 300, cloud platform 400, computational node 500, and/or process 800 to provide information. In some examples, data requests 630 may indicate a request to provide information related to input data, such as the input data obtained by Step 720, Step 770, Step 1240, and/or Step 1310. In some examples, data requests 630 may indicate a request to provide at least part of the input data that was obtained by Step 720, Step 770, Step 1240, and/or Step 1310. In some examples, data requests 630 may indicate a request to provide information related to an inference model, such as the inference model obtained by Step 710. In some examples, data requests 630 may indicate a request to provide at least part of an inference model, such as the inference model obtained by Step 710. In some examples, data requests 630 may indicate a request to provide information related to the results of applying input data to an inference model, such as the results obtained by Step 730. In some examples, data requests 630 may indicate a request to provide at least part of the results of applying input data to an inference model, such as the results obtained by Step 730. In some examples, data requests 630 may indicate a request to provide information related to the execution of: Step 710, Step 720, Step 730, any part of the above steps, any combination of the above, and so forth. Examples of such information may include: running time, memory usage, sensor settings, and so forth.

In some embodiments, one or more data requests 630 may be based, at least in part, on performance information 610. For example, performance information 610 may comprise at least part of the results of applying input data to an inference model, such as the results obtained by Step 730, and data requests 630 may be based, at least in part, on the results, for example having one data request 630 for results in one range, a second data request 630 for results in a second range of results, and no data request 630 for results in a third range of results. For example, performance information 610 may comprise at least part of the input data obtain by Step 720, and data requests 630 may be based, at least in part, on a the input data, for example having one data request 630 for a first group of input data, a second data request 630 for a second group of input data, and no data request 630 for a third group of input data. For example, performance information 610 may comprise information related to the running time of one or more steps, and data requests 630 may be based, at least in part, on the running time, for example having one data request 630 for a running time in one range, a second data request 630 for running time in a second range of running times, and no data request 630 for running time in a third range. For example, performance information 610 may comprise information related to the memory usage of one or more steps, and data requests 630 may be based, at least in part, on the memory usage, for example having one data request 630 for memory usage in one range, a second data request 630 for memory usage in a second range, and no data request 630 for memory usage in a third range. For example, performance information 610 may comprise the settings of one or more sensors used to obtain input data, and data requests 630 may be based, at least in part, on the settings, for example having one data request 630 for one settings, a second data request 630 for a second settings, and no data request 630 for other settings.

In some embodiments, one or more data requests 630 may be based, at least in part, on historical information stored in memory, such as historical information stored in memory units 210 and/or shared memory units 410. For example, the historical information may comprise information received by from a plurality of apparatuses executing process 700 and/or process 800. For example, the historical information may comprise historical information from previous executions of at least one of: process 700, process 800, process 900, process 1000, process 1100, process 1200, process 1300, and process 1400. In some examples, the historical information may comprise performance information records; performance information 610 may be compared to the performance information records; and data request 630 may be based, at least in part, on the comparison result. In some examples, the historical information may comprise at least one rule for classifying performance information 610; performance information 610 may be classified using the at least one rule; and data request 630 may be based, at least in part, on the classification result. In some examples, the historical information may comprise input data records; and performance information 610 may be based, at least in part, on the input data records.

In some embodiments, transmitting a data request (Step 1010) may comprise transmitting one or more data requests 630 using one or more communication devices, such as communication modules 230, internal communication modules 440, external communication modules 450, and so forth.

In some embodiments, receiving a data request (Step 810) may comprise receiving one or more data requests 630 using one or more communication devices, such as communication modules 230, internal communication modules 440, external communication modules 450, and so forth.

In some embodiments, selecting a portion of the input data (Step 820) may comprise selecting a portion of the input data, for example by processing units 220. For example, selecting a portion of the input data (Step 820) may comprise selecting a portion of the input data obtained by Step 720, Step 770, Step 1240, and/or Step 1310. In some examples, the input data may be continuous, and the selected portion of the input data may be continuous and/or discontinuous. In some examples, selecting a portion of the input data (Step 820) may be based, at least in part, on the input data, from example on the input data obtained by Step 720, Step 770, Step 1240, and/or Step 1310. For example selecting one portion of the input data for input data in one group, a second portion of the input data for input data in a second group, and no portion of the input data for input data in a third group. In some examples, selecting a portion of the input data (Step 820) may be based, at least in part, on one or more inference models, for example on the inference model obtained by Step 710. For example selecting one portion of the input data for inference models in one group, a second portion of the input data for inference models in a second group, and no portion of the input data for inference models in a third group. In some examples, selecting a portion of the input data (Step 820) may be based, at least in part, on one or more results, for example on results obtained by applying input data to an inference model, such as the results obtained by Step 730. For example selecting one portion of the input data for results in one group, a second portion of the input data for results in a second group, and no portion of the input data for results in a third group.

In some examples, selecting a portion of the input data (Step 820) may be based, at least in part, on performance information 610. For example, performance information 610 may comprise the running time of: Step 710, Step 720, Step 730, any part of the above steps, any combination of the above, and so forth; and selecting a portion of the input data (Step 820) may be based, at least in part, on the running time. For example, performance information 610 may comprise the memory usage of: Step 710, Step 720, Step 730, any part of the above steps, any combination of the above, and so forth; and selecting a portion of the input data (Step 820) may be based, at least in part, on the memory usage. In another example, performance information 610 may comprise the settings of one or more sensors used by Step 720 to obtain the input data, and selecting a portion of the input data (Step 820) may be based, at least in part, on the settings. For example, performance information 610 may comprise at least part of the input data, and Step 820 may select another portion of the input data based, at least in part, on the at least part of the input data. For example, performance information 610 may comprise at least part of an inference model, and Step 820 may select a portion of the input data based, at least in part, on the at least part of the inference model. For example, performance information 610 may comprise at least part of a result obtained by applying input data to an inference model, and Step 820 may select a portion of the input data based, at least in part, on the at least part of the result.

In some examples, selecting a portion of the input data (Step 820) may be based, at least in part, on data requests, such as data requests 630. For example, data requests 630 may specify a portion of the input data, and the specified portion may be selected by Step 820. For example, data requests 630 may specify a rule for selecting a portion of the input data, and Step 820 may select a portion of the input data based, at least in part, on the specified rule. For example, data requests 630 may comprise at least part of the input data, and Step 820 may select another portion of the input data based, at least in part, on the at least part of the input data. For example, data requests 630 may comprise at least part of an inference model, and Step 820 may select a portion of the input data based, at least in part, on the at least part of the inference model. For example, data requests 630 may comprise at least part of a result obtained by applying input data to an inference model, and Step 820 may select a portion of the input data based, at least in part, on the at least part of the result. For example, data requests 630 may comprise at least part of performance information 610, and Step 820 may select a portion of the input data based, at least in part, on the at least part of performance information 610.

In some embodiments, transmitting a portion of the input data (Step 830) may comprise transmitting using one or more communication devices, such as communication modules 230, internal communication modules 440, external communication modules 450, and so forth, at least one of: input data 640; input data, such as the input data obtained by Step 720; a portion of the input data, such as a portion of the input data obtained by Step 720, a portion of the input data selected by Step 820, and so forth.

In some embodiments, transmitting a portion of the input data (Step 830) may also comprise transmitting: information related to an inference model, such as the inference model obtained by Step 710; at least part of an inference model, such as the inference model obtained by Step 710; information related to the results of applying input data to an inference model, such as the results obtained by Step 730; at least part of the results of applying input data to an inference model, such as the results obtained by Step 730; information related to the execution of: Step 710, Step 720, Step 730, any part of the above steps, any combination of the above, and so forth, such as running time, memory usage, and so forth In some embodiments, receiving a portion of the input data (Step 1020) may comprise receiving using one or more communication devices, such as communication modules 230, internal communication modules 440, external communication modules 450, etc., at least one of: input data 640; input data, such as the input data obtained by Step 720; a portion of the input data, such as a portion of the input data obtained by Step 720, a portion of the input data selected by Step 820, etc.; information transmitted by Step 830.

In some embodiments, receiving a portion of the input data (Step 1020) may also comprise receiving: information related to an inference model, such as the inference model obtained by Step 710; at least part of an inference model, such as the inference model obtained by Step 710; information related to the results of applying input data to an inference model, such as the results obtained by Step 730; at least part of the results of applying input data to an inference model, such as the results obtained by Step 730; information related to the execution of: Step 710, Step 720, Step 730, any part of the above steps, any combination of the above, and so forth, such as running time, memory usage, and so forth.

In some embodiments, generating an update (Step 920) may comprise generating an update to an inference model, for example generating one or more updates 620 to inference model used in Step 730.

In some examples, generating an update (Step 920) may comprise generating one or more updates 620 to an inference model based, at least in part, on at least part of the input data, such as on: a portion of the input data received by Step 1020; a portion of the input data included in performance information 610; and so forth. For example, generating an update (Step 920) may generate one set of updates 620 for a first group of input data, a second set of updates 620 for a second group of input data, and so forth.

In some examples, generating an update (Step 920) may comprise generating one or more updates 620 to an inference model based, at least in part, on at least part of an inference model, such as the inference model obtained by Step 710, a portion of an inference model received by Step 1020, a portion of an inference model included in performance information 610, and so forth. For example, generating an update (Step 920) may generate one set of updates 620 for a first group of inference models, a second set of updates 620 for a second group of inference models, and so forth.

In some examples, generating an update (Step 920) may comprise generating one or more updates 620 to an inference model based, at least in part, on at least part of the results of applying input data to an inference model, such as the results obtained by Step 730, the at least part of the results may be received by Step 1020, at least part of some results included in performance information 610, and so forth. For example, generating an update (Step 920) may generate one set of updates 620 for a first group of results, a second set of updates 620 for a second group of results, and so forth.

In some examples, generating an update (Step 920) may comprise generating one or more updates 620 to an inference model based, at least in part, on performance information 610. For example, performance information 610 may comprise the running time of: Step 710, Step 720, Step 730, any part of the above steps, any combination of the above, and so forth; and generating an update (Step 920) may be based, at least in part, on the running time, for example by generating an update corresponding to a more intensive inference model when the running time is lower than one threshold, by generating an update corresponding to a less intensive inference model when the running time is higher than another threshold, and so forth. For example, performance information 610 may comprise the memory usage of: Step 710, Step 720, Step 730, any part of the above steps, any combination of the above, and so forth; and generating an update (Step 920) may be based, at least in part, on the memory usage, for example by generating an update corresponding to a more intensive inference model when the memory usage is lower than one threshold, by generating an update corresponding to a less intensive inference model when the memory usage is higher than another threshold, and so forth. In another example, performance information 610 may comprise the settings of one or more sensors used by Step 720 to obtain the input data, and generating an update (Step 920) may be based, at least in part, on the settings, for example, by selecting an inference model more suitable for the settings.

In some examples, generating an update (Step 920) may comprise generating one or more updates 620 to an inference model based, at least in part, on historical information stored in memory, such as historical information stored in memory units 210 and/or shared memory units 410. For example, the historical information may comprise information received by from a plurality of apparatuses executing process 700 and/or process 800. For example, the historical information may comprise historical information from previous executions of at least one of: process 700, process 800, process 900, process 1000, process 1100, process 1200, process 1300, and process 1400. In some examples, the historical information may comprise a plurality of performance information records; performance information 610 may be compared to the performance information records; and updates 620 may be based, at least in part, on the comparison result. In some examples, the historical information may comprise at least one rule for classifying performance information 610; performance information 610 may be classified using the at least one rule; and updates 620 may be based, at least in part, on the classification result. In some examples, the historical information may comprise input data records, and updates 620 may be based, at least in part, on the input data records.

In some embodiments, receiving performance information (Step 910) may comprise receiving a plurality of performance information records from a plurality of apparatuses, for example using one or more communication devices, such as communication modules 230, internal communication modules 440, external communication modules 450, and so forth. In some examples, generating an update (Step 920) may comprise generating one or more updates 620 based, at least in part, on the plurality of performance information records. For example, the plurality of performance information records may be compared to each other and/or to performance information 610, and updates 620 may be based, at least in part, on the result of the comparison, for example using a nearest neighbor algorithm, using clustering algorithms, and so forth. For example, the plurality of performance information records may be used to find one or more centroids and/or one or more prototypes of the performance information records, and updates 620 may be based, at least in part, on the one or more centroids and/or one or more prototypes.

In some embodiments, generating an update (Step 920) may comprise selecting an update to an inference model of a plurality of alternative updates, for example selecting one or more updates 620 to the inference model used in Step 730 of a plurality of alternative updates. The plurality of alternative updates may be stored in a memory unit, such as memory units 210, shared memory modules 410, and so forth. The selection of updates 620 may be based on available information, as described above. In some embodiments, generating an update (Step 920) may comprise selecting one or more training examples, for example selecting one or more training examples of a plurality of alternative training examples. The plurality of alternative training examples may be stored in a memory unit, such as memory units 210, shared memory modules 410, and so forth. The selection of the training examples may be based on available information, as described above. In some embodiments, generating an update (Step 920) may comprise selecting one or more inference models, for example selecting one or more inference models of a plurality of alternative inference models. The plurality of alternative inference models may be stored in a memory unit, such as memory units 210, shared memory modules 410, and so forth. The selection of the inference models may be based on available information, as described above. In some embodiments, generating an update (Step 920) may comprise selecting one or more components of an inference model, for example selecting one or more components of an inference model of a plurality of alternative components. The plurality of alternative components may be stored in a memory unit, such as memory units 210, shared memory modules 410, and so forth. The selection of the components may be based on available information, as described above.

In some embodiments, generating an update (Step 920) may comprise generating at least part of an inference model, for example by training algorithms, such as machine learning algorithms and/or deep learning algorithms, on training examples. The one or more updates 620 to the inference model used in Step 730 may comprise the generated at least part of an inference model. The training examples may include examples of data instances. In some cases, each data instance may be labeled with a corresponding desired result. In some examples, the training examples may be selected as described above. In some examples, the training examples may be received using one or more communication devices, such as communication modules 230, internal communication modules 440, external communication modules 450, and so forth. In some examples, synthetic training examples may be generated, for example by selecting one or more parameters to a template of synthetic training examples.

In some embodiments, generating an update (Step 920) may comprise generating one or more neural network model, for example by selecting one or more parameters of a neural network model, by selecting a portion of a neural network model, by selecting one or more neural network model of a plurality of alternative neural network models, by training a neural network model on training examples, and so forth.

In some embodiments, transmitting the update (Step 930) may comprise transmitting one or more updates 620 using one or more communication devices, such as communication modules 230, internal communication modules 440, external communication modules 450, and so forth.

In some embodiments, receiving an update (Step 750) may comprise receiving one or more updates 620 using one or more communication devices, such as communication modules 230, internal communication modules 440, external communication modules 450, and so forth.

In some embodiments, one or more updates 620 may enable Step 760 (obtaining a second inference model) to obtain a second inference model. In some examples, updates 620 may comprise one or more inference models, and obtaining a second inference model (Step 760) may comprise obtaining the one or more inference models included in updates 620.

In some examples, updates 620 may comprise one or more inference model components, and obtaining a second inference model (Step 760) may comprise obtaining the one or more inference model components included in updates 620, and generating at least one inference model using the obtained components, for example by replacing one or more parts of an existing inference model with the obtained components. Examples of existing inference models may include at least one of: inference model obtained by Step 710, inference model stored in memory unit, inference model received using a communication device, and so forth. Examples of inference model components may include: one or more parameters of an inference model; one or more coefficient of an inference model; one or more inference model of a combined inference model that may comprise a combination of two or more inference models; and so forth.

In some embodiments, obtaining a second inference model (Step 760) may comprise receiving at least part of the second inference model using one or more communication devices, such as communication modules 230, internal communication modules 440, external communication modules 450, and so forth. In some examples, obtaining a second inference model (Step 760) may comprise of Step 1230 (described below). In some examples, Step 760 may use information included in updates 620 in receiving the at least part of the second inference model using one or more communication devices, such as communication modules 230, internal communication modules 440, external communication modules 450, and so forth. For example, updates 620 may comprise instructions and/or parameters regarding: where to obtain the second inference model from; which inference model to obtain; which parts of the obtained inference model to use; parameters for modifying the obtained inference model; and so forth.

In some embodiments, obtaining a second inference model (Step 760) may comprise reading at least part of the second inference model from memory units, such as memory units 210, shared memory modules 410, and so forth. In some examples, Step 760 may use information included in updates 620 in reading the at least part of the second inference model from the memory units. For example, updates 620 may comprise instructions and/or parameters regarding: where to read the second inference model from; which inference model to read of a plurality of alternative inference models stored in memory; which parts of the read inference model to use; parameters for modifying the read inference model; and so forth.

In some embodiments, obtaining a second inference model (Step 760) may comprise selecting one or more inference models of a plurality of alternative inference models. The plurality of alternative inference models may be stored in a memory unit, such as memory units 210, shared memory modules 410, and so forth. The selection of the one or more inference models may be based on available information, such as: updates 620; performance information 610; results of applying input data to an inference model, such as the results obtained by Step 730; the input data obtain in Step 720; the inference model obtained in Step 710; historical information as described below; and so forth. In some embodiments, obtaining a second inference model (Step 760) may comprise selecting one or more training examples, for example selecting one or more training examples of a plurality of alternative training examples. The plurality of alternative training examples may be stored in a memory unit, such as memory units 210, shared memory modules 410, and so forth. The selection of the training examples may be based on available information, such as: updates 620; performance information 610; results of applying input data to an inference model, such as the results obtained by Step 730; the input data obtain in Step 720; the inference model obtained in Step 710; historical information as described below; and so forth. In some embodiments, generating one or more inference models may comprise selecting one or more components of an inference model, for example selecting one or more components of an inference model of a plurality of alternative components. The plurality of alternative components may be stored in a memory unit, such as memory units 210, shared memory modules 410, and so forth. The selection of the components may be based on available information, such as: updates 620; performance information 610; results of applying input data to an inference model, such as the results obtained by Step 730; the input data obtain in Step 720; the inference model obtained in Step 710; historical information as described below; and so forth.

In some embodiments, at least part of the second inference model obtained by Step 760 may be the result of training algorithms, such as machine learning algorithms and deep learning algorithms, on training examples. The training examples may include examples of data instances, and in some cases, each data instance may be labeled with a corresponding desired result. In some examples, updates 620 may comprise information related to the training examples, and obtaining a second inference model (Step 760) may comprise training algorithms based, at least in part, on updates 620 to obtain the second inference model. In some examples, updates 620 may comprise labels for data instance, and the algorithms may be trained using these labels. In some examples, updates 620 may comprise training examples, and the algorithms may be trained using these training examples. In some examples, updates 620 may comprise instructions and/or parameters for obtaining training examples, and the algorithms may be trained using the training examples obtained based, at least in part, on the instructions and/or parameters included in updates 620. In some examples, the algorithms may be trained using at least some of the training examples used in generating the first inference model obtain by Step 710, and/or new training examples obtained based, at least in part, on updates 620. In some examples, synthetic training examples may be generated, for example by selecting one or more parameters to a template of synthetic training examples based, at least in part, on information included in updates 620.

In some embodiments, at least part of the second inference model obtained by Step 760 may comprise one or more neural networks. In some embodiments, obtaining a second inference model (Step 760) may comprise generating one or more neural network models, for example by selecting one or more parameters of a neural network model, by selecting a portion of a neural network model, by selecting one or more neural network model of a plurality of alternative neural network models, by training a neural network model on training examples, and so forth. In some embodiments, the input data obtained by Step 770 may comprise image data, and the second inference model may comprise at least one of: face detector, face recognition model, object detector, motion detector, activity detector, gesture recognition model, image segmentation model, video segmentation models, and so forth. In some embodiments, the input data obtained by Step 770 may comprise audio data and the second inference model may comprise at least one of: speaker recognition model, speech recognition model, audio segmentation model, and so forth. In some embodiments, the second inference model may comprise at least one of: a classifier, a regression model, a segmentation model, and so forth. In some embodiments, the second inference model may comprise a combination of a plurality of inference models.

In some embodiments, obtaining a second inference model (Step 760) may comprise obtaining at least part of the second inference based, at least in part, on at least part of the input data obtained by Step 720. For example, obtaining a second inference model (Step 760) may generate one inference model for a first group of input data, a second inference model for a second group of input data, and so forth. In some embodiments, obtaining a second inference model (Step 760) may comprise obtaining at least part of the second inference based, at least in part, on at least part of the inference model obtained by Step 710. For example, obtaining a second inference model (Step 760) may generate one inference model for a first group of inference models obtained by Step 710, a second inference model for a second group of inference models obtained by Step 710, and so forth. In some embodiments, obtaining a second inference model (Step 760) may comprise obtaining at least part of the second inference based, at least in part, on at least part of the results of applying input data to an inference model, such as the results obtained by Step 730. For example, obtaining a second inference model (Step 760) may generate one inference model for a first group of results, a second inference model for a second group of results, and so forth. In some embodiments, obtaining a second inference model (Step 760) may comprise obtaining at least part of the second inference based, at least in part, on the settings of one or more sensors used by Step 720 to obtain the input data. For example, obtaining a second inference model (Step 760) may generate one inference model for a first group of settings, a second inference model for a second group of settings, and so forth.

In some embodiments, obtaining a second inference model (Step 760) may comprise obtaining at least part of the second inference based, at least in part, on the running time of: Step 710, Step 720, Step 730, any part of the above steps, any combination of the above, and so forth. For example, obtaining a second inference model (Step 760) may generate one inference model for a first group of running times, a second inference model for a second group of running times, and so forth. For example, obtaining a second inference model (Step 760) may generate a more intensive inference model when the running time is lower than one threshold, generate a less intensive inference model when the running time is higher than another threshold, and so forth.

In some embodiments, obtaining a second inference model (Step 760) may comprise obtaining at least part of the second inference based, at least in part, on the memory usage of: Step 710, Step 720, Step 730, any part of the above steps, any combination of the above, and so forth. For example, obtaining a second inference model (Step 760) may generate one inference model for a first group of memory usages, a second inference model for a second group of memory usages, and so forth. For example, obtaining a second inference model (Step 760) may generate a more intensive inference model when the memory usage is lower than one threshold, generate a less intensive inference model when the memory usage is higher than another threshold, and so forth.

In some examples, obtaining a second inference model (Step 760) may comprise obtaining one or more inference models based, at least in part, on historical information stored in memory, such as historical information stored in memory units 210 and/or shared memory units 410. For example, the historical information may comprise historical information from previous executions of at least one of: process 700, process 800, process 900, process 1000, process 1100, process 1200, process 1300, and process 1400. In some examples, the historical information may comprise update records; updates 620 may be compared to the update records; and the inference models may be based, at least in part, on the comparison result. In some examples, the historical information may comprise at least one rule for classifying updates 620; updates 620 may be classified using the at least one rule; and the inference models may be based, at least in part, on the classification result. In some examples, the historical information may comprise input data records, and the inference models may be based, at least in part, on the input data records. In some examples, the historical information may comprise results records, and the inference models may be based, at least in part, on the results records. In some examples, the historical information may comprise inference model records, and the inference models may be based, at least in part, on the inference model records.

In some embodiments, scene information 650 may comprise information related to information captured using one or more sensors from an environment. For example, scene information 650 may comprise: information related to the distribution of captured information, for example in the form of frequencies at which different types of information are captured, in the form of a histogram, etc.; minimal levels captured; maximal levels captured; aggregated and/or statistical measurements related to information captured using one or more sensors over time; typical captured data instances; results of applying captured data to a clustering algorithm, such as k-means, spectral clustering, etc.; results of applying captured data to a dimensionality reduction algorithm, such as principal component analysis (PCA), canonical correlation analysis (CCA), etc.; and so forth.

In some embodiments, generating scene information (Step 1210) may comprise generating scene information 650 related to an environment. For example, generating scene information (Step 1210) may be perform by processing units 220 of apparatus 200, and generating scene information (Step 1210) may comprise generating scene information 650 related to the environment of apparatus 200. In some examples, generating scene information (Step 1210) may comprise generating scene information 650 based, at least in part, on information captured using one or more sensors. Examples of such sensors may include: audio sensors 250; image sensors 260; motion sensors 270; positioning sensors 275; chemical sensors 280; temperature sensors 285; barometers; pressure sensors; proximity sensors; electrical impedance sensors; electrical voltage sensors; electrical current sensors; and so forth. For example, generating scene information (Step 1210) may comprise calculating one or more aggregated and/or statistical measurements related to information captured using one or more sensors over time, and scene information 650 may comprise the one or more aggregated and/or statistical measurements. Examples of such aggregated and/or statistical measurements may include: sum of captured values over a selected time length; mean of captured values; standard deviation of captured values; variance of captured values; histogram of captured values; maximum of captured values; minimum of captured values; results of applying captured data to a clustering algorithm, such as k-means, spectral clustering, etc.; results of applying captured data to a dimensionality reduction algorithm, such as principal component analysis (PCA), canonical correlation analysis (CCA), etc.; and so forth.

In some embodiments, generating scene information (Step 1210) may comprise generating scene information 650 based, at least in part, on one or more images, such as one or more images captured using image sensors 260 from an environment of image sensors 260. In some examples, generating scene information (Step 1210) may comprise at least one of: capturing one or more images using image sensors 260; reading one or more images captured using image sensors 260 from a memory unit, such as memory units 210, shared memory modules 410, etc.; receiving one or more images captured by image sensors 260 using one or more communication devices, such as communication modules 230, internal communication modules 440, external communication modules 450, etc.; and so forth.

In some examples, generating scene information (Step 1210) may comprise selecting one or more portions of one or more images captured using image sensors 260, and scene information 650 may comprise information related to the selected one or more portions. For example, image sensors 260 may be stationary, a motion analysis of a video may be performed, and the portions of the video that has no or little movement may be selected. In another example, image gradients may be calculated, and the portions of the video that has high variance of gradients may be selected. In another example, face detector may be used to detect faces appearing in the one or more images, and portions of the one or more images containing faces may be selected.

In some examples, generating scene information (Step 1210) may comprise extracting background from video captured by image sensors 260, and scene information 650 may comprise at least one of: an image of the extracted background of the environment; information related to the extracted background; and so forth. Examples of algorithms from extracting background may include: taking the median of the video; taking the median of the video after adjusting for ego motion of image sensors 260; taking the mean of the video; taking the mean of the video after adjusting for ego motion of image sensors 260; taking the mode of the video; taking the mode of the video after adjusting for ego motion of image sensors 260; and so forth.

In some examples, generating scene information (Step 1210) may comprise detecting objects in the one or more images captured by image sensors 260, and scene information 650 may comprise at least one of: identifying information of the detected objects; information related to the detected objects; positions at which one or more objects were detected; frequencies at which different objects are detected; images of detected objects; and so forth. In some cases, scene information 650 may comprise a mapping that specifies for different pixels and/or image regions: the objects detected at these pixels and/or regions; the frequencies at which objects are detected at these pixels and/or regions; the frequencies at which specific objects are detected at these pixels and/or regions; and so forth. In some cases, object detection algorithms may be used to detect objects in the one or more images captured by image sensors 260. Some examples of such object detection algorithms may include: deep learning based object detection algorithms; appearance based object detection algorithms; image features based object detection algorithms; and so forth.

In some examples, generating scene information (Step 1210) may comprise detecting faces and/or recognizing faces in the one or more images captured by image sensors 260, and scene information 650 may comprise at least one of: identifying information of the detected and/or recognized faces; information related to the detected and/or recognized faces; positions at which one or more faces were detected; frequencies at which different faces are appearing; images of detected and/or recognized faces; and so forth. In some cases, scene information 650 may comprise information related to people appearing regularly in the images, for example of people appearing in more than a selected number of images. In some cases, scene information 650 may comprise a mapping that specifies for different pixels and/or image regions: the faces detected at these pixels and/or regions; the frequencies at which faces are detected at these pixels and/or regions; the frequencies at which specific faces are detected at these pixels and/or regions; and so forth. In some cases, face detection algorithms and/or face recognition algorithms may be used to detect and/or recognize faces in the one or more images captured by image sensors 260. Some examples of such face detection algorithms may include: deep learning based face detection algorithms; appearance based face detection algorithms; color based face detection algorithms; texture based face detection algorithms; shape based face detection algorithms; motion based face detection algorithms; boosting based face detection algorithms; and so forth. Some examples of such face recognition algorithms may include: deep learning based face recognition algorithms; appearance based face recognition algorithms; color based face recognition algorithms; texture based face recognition algorithms; shape based face recognition algorithms; motion based face recognition algorithms; boosting based face recognition algorithms; dimensionality reduction based face recognition algorithms, such as eigenfaces, Fisherfaces, etc.; 3D face recognition algorithms; and so forth.

In some embodiments, generating scene information (Step 1210) may comprise generating scene information 650 based, at least in part, on audio data, such as audio data captured using audio sensors 250 from an environment of audio sensors 250. In some examples, generating scene information (Step 1210) may comprise at least one of: capturing audio data using audio sensors 250; reading audio data captured using audio sensors 250 from a memory unit, such as memory units 210, shared memory modules 410, etc.; receiving audio data captured by audio sensors 250 using one or more communication devices, such as communication modules 230, internal communication modules 440, external communication modules 450, etc.; and so forth.

In some examples, generating scene information (Step 1210) may comprise identifying one or more characteristics of the ambient noise present in an audio data captured using audio sensors 250, and scene information 650 may comprise: the one or more characteristics of the ambient noise; a model of the ambient noise; information related to the ambient noise; and so forth. For example, the noise level may be monitored over time, and minimal noise level or histogram of noise levels may be determined. In another example, typical frequencies of ambient noise may be identified, for example by clustering the frequencies present in the audio data when the noise level is below a selected threshold.

In some examples, generating scene information (Step 1210) may comprise identifying one or more speakers in the audio data captured using audio sensors 250, and scene information 650 may comprise the information related to the identified one or more speakers in the audio data. For example, voice models may be constructed for the identified one or more speakers in the audio data; and scene information 650 may comprise the voice models. In another example, scene information 650 may comprise information related to the speaking time of the one or more speakers in the audio data, such as the total speaking time of each speaker, the total speaking time for all speakers cumulatively, histogram of the speaking times with respect to time in day, and so forth.

In some embodiments, transmitting the scene information (Step 1220) may comprise transmitting scene information 650 using one or more communication devices, such as communication modules 230, internal communication modules 440, external communication modules 450, and so forth.

In some embodiments, receiving scene information (Step 1110) may comprise receiving scene information 650 using one or more communication devices, such as communication modules 230, internal communication modules 440, external communication modules 450, and so forth.

In some embodiments, obtaining a first inference model and a second inference model (Step 1120) may comprise obtaining a first inference model and a second inference model based, at least in part, on scene information 650. For example, obtaining a first inference model and a second inference model (Step 1120) may generate one pair of inference models for one scene information 650, a second pair of inference models for a second scene information 650, and so forth. In some examples, scene information 650 may be received, for example by Step 1110, using one or more communication devices, such as communication modules 230, internal communication modules 440, external communication modules 450, and so forth. In some examples, scene information 650 may be read from memory units, such as memory units 210, shared memory modules 410, and so forth. In some examples, scene information 650 may be generated, for example by Step 1210.

In some examples, obtaining a first inference model and a second inference model (Step 1120) may comprise obtaining a first inference model that may be suitable for execution on a first device, and obtaining a second inference model that may be suitable for execution on a second device. For example, the first device may be apparatus 200, and the second device may be at least one of: server 300, cloud platform 400, computational node 500, and so forth. In some examples, the first device may have a smaller memory capacity and/or processing capabilities than the second device, and Step 1120 may obtain a first inference model that may be suitable for the memory capacity and/or processing capabilities of the first device, and obtain a second inference model that may be inadequate for the memory capacity and/or processing capabilities of the first device but may be suitable to the memory capacity and/or processing capabilities of the second device. For example, the first inference model and the second inference model may comprise neural networks, and the neural network of the first inference model may be smaller than the neural network of the second inference model. For example, the first inference model and the second inference model may comprise random decision forests, and the random decision forest of the first inference model may comprise a smaller number of decision trees and/or smaller decision trees than the random decision forest of the second inference model. For example, the first inference model and the second inference model may comprise ensemble learning models, and the ensemble learning model of the first inference model may be smaller than the ensemble learning model of the second inference model. For example, the first inference model and the second inference model may comprise of a combination of inference models, and the combination of inference models of the first inference model may be smaller than the combination of inference models of the second inference model. For example, the first inference model and the second inference model may comprise inference models based, at least in part, on accessing a dataset of examples, such as a nearest neighbor search models, and the dataset the first inference model may be based, at least in part, on may be smaller than the dataset the second inference model may be based, at least in part, on. In some examples, the first device may be a battery powered device, and therefore have a power consumption limitations that may not be applicable to the second device, and Step 1120 may obtain a first inference model that may be suitable the power consumption limitations of the first device, and obtain a second inference model that may be inadequate for the power consumption limitations of the first device but may be suitable for the second device. For example, the first inference model comprise inference models based, at least in part, on accessing information in memory, such as a face detector, and the first inference model may be configured to operate with smaller number of memory accesses than the second inference model, for example by limiting the search area and/or search resolution of the face detector.

In some embodiments, obtaining a first inference model and a second inference model (Step 1120) may comprise receiving at least part of a first inference model and/or a second inference model using one or more communication devices, such as communication modules 230, internal communication modules 440, external communication modules 450, and so forth. In some examples, Step 1120 may use information included in scene information 650 in receiving the at least part of the first inference model and/or the second inference model using the one or more communication devices. For example, scene information 650 may comprise information and/or parameters that may be used to decide: where to obtain the inference models from; which inference models to obtain; which parts of the obtained inference models to use; parameters for modifying the obtained inference models; and so forth.

In some embodiments, obtaining a first inference model and a second inference model (Step 1120) may comprise reading at least part of a first inference model and/or a second inference model from memory units, such as memory units 210, shared memory modules 410, and so forth. In some examples, Step 1120 may use information included in scene information 650 in reading the at least part of the first inference model and/or the second inference model from the memory units. For example, scene information 650 may comprise information and/or parameters that may be used to decide: where to read the inference models from; which inference models to read of a plurality of alternative inference models stored in memory; which parts of the read inference models to use; parameters for modifying the read inference models; and so forth.

In some embodiments, obtaining a first inference model and a second inference model (Step 1120) may comprise selecting a first inference model and/or a second inference model of a plurality of alternative inference models. The plurality of alternative inference models may be stored in a memory unit, such as memory units 210, shared memory modules 410, and so forth. The selection of the one or more inference models may be based, at least in part, on available information, such as: scene information 650; historical information as described below; and so forth. In some embodiments, obtaining a first inference model and a second inference model (Step 1120) may comprise selecting one or more training examples, for example selecting one or more training examples of a plurality of alternative training examples. The plurality of alternative training examples may be stored in a memory unit, such as memory units 210, shared memory modules 410, and so forth. The selection of the training examples may be based, at least in part, on available information, such as: scene information 650; historical information as described below; and so forth. In some embodiments, obtaining a first inference model and a second inference model (Step 1120) may comprise selecting one or more components of a first inference model and/or a second inference model, for example selecting one or more components of an inference model of a plurality of alternative components. The plurality of alternative components may be stored in a memory unit, such as memory units 210, shared memory modules 410, and so forth. The selection of the components may be based, at least in part, on available information, such as: scene information 650; historical information as described below; and so forth.

In some embodiments, at least part of the first inference model and/or the second inference model obtained by Step 1120 may be the result of training algorithms, such as machine learning algorithms and deep learning algorithms, on training examples. The training examples may include examples of data instances, and in some cases, each data instance may be labeled with a corresponding desired result. In some examples, scene information 650 may comprise information related to the training examples, and obtaining a first inference model and a second inference model (Step 1120) may comprise training algorithms based, at least in part, on scene information 650 to obtain the first inference model and/or the second inference model. In some examples, scene information 650 may comprise labels for data instance, and the algorithms may be trained using these labels. In some examples, scene information 650 may comprise training examples, and the algorithms may be trained using these training examples. In some examples, scene information 650 may comprise information and/or parameters that may be used for obtaining training examples; and the algorithms may be trained using the training examples obtained based, at least in part, on the information and/or parameters included in scene information 650. In some examples, synthetic training examples may be generated, for example by selecting one or more parameters to a template of synthetic training examples based, at least in part, on information included in scene information 650.

In some embodiments, at least part of the first inference model and/or the second inference model obtain by Step 1120 may comprise one or more neural networks. In some embodiments, obtaining a first inference model and a second inference model (Step 1120) may comprise generating one or more neural network models, for example: by selecting one or more parameters of a neural network model, by selecting a portion of a neural network model, by selecting one or more neural network model of a plurality of alternative neural network models, by training a neural network model on training examples, and so forth. In some embodiments, the input data obtained by Step 1240 may comprise image data, and the first inference model and/or the second inference model may comprise at least one of: face detector, face recognition model, object detector, motion detector, activity detector, gesture recognition model, image segmentation model, video segmentation models, and so forth. In some embodiments, the input data obtained by Step 1240 may comprise audio data and the first inference model and/or the second inference model may comprise at least one of: speaker recognition model, speech recognition model, audio segmentation model, and so forth. In some embodiments, the first inference model and/or the second inference model may comprise at least one of: a classifier, a regression model, a segmentation model, and so forth. In some embodiments, the first inference model and/or the second inference model may comprise a combination of a plurality of inference models.

In some embodiments, obtaining a first inference model and a second inference model (Step 1120) may comprise obtaining a first inference model and/or a second inference model based, at least in part, on historical information stored in memory, such as historical information stored in memory units 210 and/or shared memory units 410. For example, the historical information may comprise historical information from previous executions of at least one of: process 700, process 800, process 900, process 1000, process 1100, process 1200, process 1300, and process 1400. In some examples, the historical information may comprise scene information records; scene information 650 may be compared to the scene information records; and the inference models may be based, at least in part, on the comparison result. In some examples, the historical information may comprise at least one rule for classifying scene information 650; scene information 650 may be classified using the at least one rule; and the inference models may be based, at least in part, on the classification result. In some examples, the historical information may comprise inference model records, and the inference models may be based, at least in part, on the inference model records.

In some examples, scene information 650 may comprise information related to the distribution of captured information, and the first inference model and/or the second inference model obtained by Step 1120 may be selected based, at least in part, on this distribution, for example: selecting inference models that requires shorter processing time and/or smaller memory usage when processing information associated with higher frequency, and a longer processing time and/or larger memory usage when processing information associated with lower frequency; selecting inference models that has lower error rate for information associated with higher frequency, and a higher error rate for information associated with lower frequency; and so forth.

In some examples, scene information 650 may comprise information related to: minimal and/or maximal captured values, variance of captured values; standard deviation of captured values; and so forth. In these examples, the first inference model and/or the second inference model obtained by Step 1120 may be selected based, at least in part, on this information, for example by normalizing the captured data based, at least in part, on the minimal and/or maximal values before further processing.

In some examples, scene information 650 may comprise information related to prototypes of captured data instances, and the first inference model and/or the second inference model obtained by Step 1120 may be selected based, at least in part, on this information, for example by representing captured data instances based, at least in part, on these prototypes.

In some examples, scene information 650 may comprise information related to a lower dimension representation, and the first inference model and/or the second inference model obtained by Step 1120 may be selected based, at least in part, on this information, for example by representing captured data instances in the lower dimension.

In some examples, scene information 650 may comprise information related to one or more portions of one or more images captured using image sensors 260, and the first inference model and/or the second inference model obtained by Step 1120 may be selected based, at least in part, on the one or more portions. For example, the information related to one or more portions may identify areas in the images, such as areas that typically capture no or little motion, areas that typically capture higher image gradients, etc., and these areas may be processed differently than other areas by the first inference model and/or the second inference model obtained by Step 1120. For example, the information related to one or more portions may include images of the one or more portions, such as images of portions that has higher image gradients, images of portions that contain faces etc., and the first inference model and/or the second inference model obtained by Step 1120 may be configured according to these portions, for example by using these portions as training examples.

In some examples, scene information 650 may comprise information related to a background extracted from one or more images captured using image sensors 260, for example in the form of a background image, and the first inference model and/or the second inference model obtained by Step 1120 may be selected based, at least in part, on information related to a background. For example, the first inference model and/or the second inference model may: comprise a foreground extraction module based, at least in part, on the information related to a background; be configured to ignore the background based, at least in part, on the information related to a background; comprise a positioning module based, at least in part, on the information related to a background; and so forth.

In some examples, scene information 650 may comprise information related to objects detected in one or more images captured using image sensors 260, and the first inference model and/or the second inference model obtained by Step 1120 may be selected based, at least in part, on information related to detected objects. For example, the first inference model and/or the second inference model may comprise one or more object detectors configured based, at least in part, on the identity and/or appearance of detected objects. For example, the first inference model and/or the second inference model may comprise one or more object detectors, and the one or more object detectors may be applied according to a mapping that specifies for different pixels and/or image regions: the objects detected at these pixels and/or regions; the frequencies at which objects are detected at these pixels and/or regions; the frequencies at which specific objects are detected at these pixels and/or regions; and so forth.

In some examples, scene information 650 may comprise information related to faces detected and/or recognized in one or more images captured using image sensors 260, and the first inference model and/or the second inference model obtained by Step 1120 may be selected based, at least in part, on information related to the faces. For example, the first inference model and/or the second inference model may comprise one or more face detectors and/or one or more face recognition models configured based, at least in part, on the identity and/or appearance of detected faces. For example, the first inference model and/or the second inference model may comprise one or more face detectors and/or one or more face recognition models, that may be applied according to a mapping that specifies for different pixels and/or image regions: the faces detected at these pixels and/or regions; the frequencies at which faces are detected at these pixels and/or regions; the frequencies at which specific faces are detected at these pixels and/or regions; and so forth.

In some examples, scene information 650 may comprise information related to ambient noise captured using audio sensors 250, and the first inference model and/or the second inference model obtained by Step 1120 may be selected based, at least in part, on the information related to the ambient noise. For example, the first inference model and/or the second inference model may comprise an ambient noise cancellation module configure based, at least in part, on the information related to the ambient noise. In another example, the first inference model and/or the second inference model may comprise speaker recognition modules and/or speech recognition modules configured based, at least in part, on the information related to the ambient noise.

In some examples, scene information 650 may comprise information related to one or more speakers in audio data captured using audio sensors 250, and the first inference model and/or the second inference model obtained by Step 1120 may be selected based, at least in part, on information related to the one or more speakers. For example, the first inference model and/or the second inference model may comprise speaker recognition modules and/or speech recognition modules configured based, at least in part, on the information related to the one or more speakers. In another example, the information related to the one or more speakers may comprise information related to the speaking time of the one or more speakers, such as the total speaking time of each speaker, the total speaking time for all speakers cumulatively, histogram of the speaking times with respect to time in day, etc., and the first inference model and/or the second inference model may comprise speaker recognition modules and/or speech recognition modules that use a priori probabilities based, at least in part, on this information.

In some embodiments, one or more inference models 660 may comprise at least the first inference model obtain by Step 1120 (obtaining a first inference model and a second inference model).

In some embodiments, transmitting the first inference model (Step 1130) may comprise transmitting one or more inference models 660 using one or more communication devices, such as communication modules 230, internal communication modules 440, external communication modules 450, and so forth.

In some embodiments, receiving an inference model (Step 1230) may comprise receiving one or more inference models 660 using one or more communication devices, such as communication modules 230, internal communication modules 440, external communication modules 450, and so forth.

In some embodiments, providing a notification (Step 1160) and/or providing a notification (Step 1440) may comprise transmitting at least one notification using one or more communication devices, such as communication modules 230, internal communication modules 440, external communication modules 450, and so forth. For example, the notification may be transmitted to an external device, such as apparatus 200, server 300, cloud platform 400, mobile phone 111, tablet 112, personal computer 113, and so forth. In some examples, the external device may provide the notification, or information based on the notification, to one or more users.

In some embodiments, providing a notification (Step 1160) and/or providing a notification (Step 1440) may comprise providing at least one notification using one or more output devices. In some examples, the one or more notifications may be provided to a user. Example of such output devices may include: one or more audio output devices; one or more textual output devices; one or more visual output devices; one or more tactile output devices; and so forth. In some examples, the one or more audio output devices may be configured to provide audible notifications to a user, for example through: a headset, a set of speakers, and so forth. In some examples, the one or more visual output devices may be configured to provide visual notifications to a user, for example through: a display screen, an augmented reality display system, a printer, LED indicators, and so forth. In some examples, the one or more tactile output devices may be configured to provide tactile notifications to a user, for example through vibrations, through motions, by applying forces, and so forth.

In some embodiments, providing a notification (Step 1160) may comprise providing notification based, at least in part, on one or more results. For example, providing a notification (Step 1160) may comprise providing notification based, at least in part, on a result received by Step 1140 (receiving a first result), and/or on a result generated by Step 1150 (generating a second result). In another example, providing a notification (Step 1160) may comprise providing notification based, at least in part, on at least one of: result received by Step 1140; a result generated by Step 730; a result generated by process 1200; and so forth.

In some examples, at least some of the results may comprise one or more classification results, and providing the notification may be based, at least in part, on the one or more classification results. For example, the provided notification may comprise at least one of the one or more classification results and/or information based, at least in part, on the one or more classification results. In another example, some notifications may be provided when the one or more classification results meet a certain condition, and may not be provided when the condition is not met. In some examples, at least some of the results may comprise one or more values, for example one or more values computed by a regression model, and providing the notification may be based, at least in part, on the one or more values. For example, the provided notification may comprise at least one the one or more values and/or information based, at least in part, on the one or more values. In another example, some notifications may be provided when the one or more values meet a certain condition, and may not be provided when the condition is not met. In some examples, at least some of the results may comprise one or more segments identified in the input data, and providing the notification may be based, at least in part, on the segments. For example, the provided notification may comprise at least one of the one or more segments and/or information based, at least in part, on the one or more segments. In another example, some notifications may be provided when the segments meet a certain condition, and may not be provided when the condition is not met.

In some examples, the input data may comprise audio data, at least some of the results may comprise information related to speakers detected in the audio data, and providing the notification may be based, at least in part, on the information related to speakers detected in the audio data. For example, the provided notification may comprise identifying information for at least one of the detected speakers and/or information based, at least in part, on the identity of the detected speakers. In another example, some notifications may be provided when the detected speaker is part of a selected group of people, and may not be provided otherwise. In some examples, the input data may comprise audio data, at least some of the results may comprise information related to speech detected in the audio data, and providing the notification may be based, at least in part, on the information related to the detected speech. For example, at least some of the results may comprise the content of the speech, for example in a textual form, and the provided notification may comprise at least part of the content of the speech, for example in a textual form, and/or information based, at least in part, on the content of the speech, such as topics extracted from the speech by natural language processing (NLP) algorithms. In another example, some notifications may be provided when the detected speech meet a certain criterion, for example regarding the volume of the speech, the pitch of the speech, the content of the speech, etc., and not be provided otherwise. In some examples, the input data may comprise audio data, at least some of the results may comprise information related to audio segments extracted from the audio data, and providing the notification may be based, at least in part, on the information related to the extracted audio segments. For example, the provided notification may comprise at least one of the one or more extracted audio segments and/or information based, at least in part, on the one or more extracted audio segments. In another example, some notifications may be provided when the extracted audio segments meet a certain condition, and may not be provided when the condition is not met. In some examples, the input data may comprise audio data, at least some of the results may comprise one or more audio sources, and providing the notification may be based, at least in part, on the audio sources. For example, the provided notification may comprise information based, at least in part, on the one or more audio sources. In another example, some notifications may be provided when the audio sources meet a certain condition, and may not be provided when the condition is not met.

In some examples, the input data may comprise image data, at least some of the results may comprise information related to faces appearing in the image data, and providing the notification may be based, at least in part, on the information related to the faces. For example, the provided notification may comprise at least one image of the one or more faces and/or information related to the faces. In another example, some notifications may be provided when the information related to the faces meet a certain condition, and may not be provided when the condition is not met. In some examples, at least some of the results may comprise identifying information of at least one person appearing in the image data, and providing the notification may be based, at least in part, on the identifying information. For example, the provided notification may comprise at least part of the identifying information and/or information based, at least in part, on the identifying information. In another example, some notifications may be provided when the identified information meets a certain condition, and may not be provided when the condition is not met. In some examples, the input data may comprise image data, at least some of the results may comprise information related to objects appearing in the image data, and providing the notification may be based, at least in part, on information related to objects appearing in the image data. For example, the provided notification may comprise information related to objects appearing in the image data. In another example, some notifications may be provided when the information related to objects appearing in the image data meet a certain condition, and may not be provided when the condition is not met. In some examples, the input data may comprise image data, at least some of the results may comprise information related to motion detected in the image data, and providing the notification may be based, at least in part, on the information related to the detected motion. For example, the provided notification may comprise at least part of the information related to the detected motion and/or information based, at least in part, on the detected motion. In another example, some notifications may be provided when the information related to the detected motion meet a certain condition, and may not be provided when the condition is not met. In some examples, the input data may comprise image data, at least some of the results may comprise information related to activities detected in the image data, and providing the notification may be based, at least in part, on the information related to the detected activities. For example, the provided notification may comprise at least part of the information related to the detected activities and/or information based, at least in part, on the detected activities. In another example, some notifications may be provided when the information related to the detected activities meet a certain condition, and may not be provided when the condition is not met. In some examples, the input data may comprise image data, at least some of the results may comprise information related to gestures detected in the image data, and providing the notification may be based, at least in part, on the information related to the detected gestures. For example, the provided notification may comprise information related to the detected gestures. In another example, some notifications may be provided when the information related to the detected gestures meet a certain condition, and may not be provided when the condition is not met. In some examples, the input data may comprise image data, at least some of the results may comprise one or more images segments, and providing the notification may be based, at least in part, on the images segments. For example, the provided notification may comprise at least one of the one or more images segments and/or information based, at least in part, on the one or more images segments. In another example, some notifications may be provided when the images segments meet a certain condition, and may not be provided when the condition is not met. In some examples, the input data may comprise image data, at least some of the results may comprise one or more information related to one or more portions and/or regions of the image data, and providing the notification may be based, at least in part, on the information related to the one or more portions and/or regions. For example, the provided notification may comprise at least one of the one or more portions and/or regions and/or information based, at least in part, on the one or more portions and/or regions. In another example, some notifications may be provided when the one or more portions and/or regions meet a certain condition, and may not be provided when the condition is not met. In some examples, the input data may comprise image data, at least some of the results may comprise an association of values with one or more one or more portions and/or regions of the image data, and providing the notification may be based, at least in part, on the association. For example, the provided notification may comprise information based, at least in part, on the association. In another example, some notifications may be provided when the association meets a certain condition, and may not be provided when the condition is not met.

In some examples, at least some of the results may comprise information related to one or more locations, and providing the notification may be based, at least in part, on the information related to the one or more locations. For example, the provided notification may comprise information related to at least one of the one or more locations. In another example, some notifications may be provided when the information related to the one or more locations meet a certain condition, and may not be provided when the condition is not met. In some examples, at least some of the results may comprise information related to one or more times, and providing the notification may be based, at least in part, on the information related to the one or more times. For example, the provided notification may comprise information related to at least one of the one or more times. In another example, some notifications may be provided when the information related to the one or more times meet a certain condition, and may not be provided when the condition is not met.

In some embodiments, providing a notification (Step 1440) may comprise providing notification based, at least in part, on classification information. For example, providing a notification (Step 1440) may comprise providing notification based, at least in part, on classification information received by Step 1410, and/or on classification information generated by Step 1430. For example, the provided notification may comprise at least part of the classification information. In another example, some notifications may be provided when the classification information meet certain conditions, and may not be provided otherwise.

In some embodiments, segmenting the image data (Step 1320) may comprise segmenting image data obtained by Step 1310 (obtaining image data). In some examples the image data may comprise one or more images, and segmenting the image data (Step 1320) may comprise segmenting at least one of the images using an image segmentation algorithm to obtain segments of the at least one of the images. Examples of such image segmentation algorithms may include: image segmentation algorithm based, at least in part, on spectral clustering; histogram based image segmentation algorithm; comparison based image segmentation algorithm; region growing image segmentation algorithm; and so forth. In some examples the image data may comprise a video, and segmenting the image data (Step 1320) may comprise segmenting the video using a video segmentation algorithm to obtain segments of the video. Examples of such video segmentation algorithms may include: spatial video segmentation algorithms; temporal video segmentation algorithms; spatio-temporal video segmentation algorithms; motion segmentation algorithms; and so forth. In some examples the image data may comprise one or more images, and segmenting the image data (Step 1320) may comprise extracting predefined image segments of at least one of the images. For example, the predefined image segments may comprise segments of predefined sizes and locations in the at least one image, such as all rectangular windows of a fixed size within the image, non-overlapping rectangular windows of a fixed size within the image, and so forth. In some examples the image data may comprise a video, and segmenting the image data (Step 1320) may comprise extracting predefined video segments of the video. For example, the predefined video segments may comprise segments of predefined sizes and locations in the video, such as all cuboid shaped windows of a fixed size within the video, non-overlapping cuboid shaped windows of a fixed size within the video, and so forth.

In some examples the image data may comprise an image, and segmenting the image data (Step 1320) may comprise: generating a similarity matrix by calculating similarities between pairs of pixels; extracting singular vectors of the similarity matrix; and clustering the pixels based, at least in part, on the singular vectors to obtain image segments. For example, let the image comprise of n pixels, denoted $x_1, \ldots, x_n$, the similarity matrix may be an n by n matrix, wherein the (i,j) element of the matrix holds a similarity measure between pixel $x_i$ and pixel $x_j$. Example of similarity measure formulas may include: negative Euclidean distance, Gaussian similarity, and so forth. The singular vectors of the similarity matrix may be calculated, for example, by calculating the singular value decomposition (SVD) of the similarity matrix. Clustering the pixels based, at least in part, on the singular vectors may be performed, for example, by a executing a k-means algorithm on the n points in the low dimensional space created by one or more singular vectors. Each of the n points may be associated with a pixel; and the clusters may correspond to image segments, where each image segment may comprise the pixels corresponding to the data points assigned to the corresponding cluster.

In some examples, the image data may comprise an image, and segmenting the image data (Step 1320) may comprise: generating a similarity matrix by calculating similarities between pairs of pixels; performing completely positive analysis on the similarity matrix; and clustering the pixels based, at least in part, on the completely positive analysis result to obtain image segments.

In some examples, the image data may comprise an image, and segmenting the image data (Step 1320) may comprise: analyzing the image using an object detection algorithm to detect objects appearing in the image; selecting image segments such that each one of the detected objects appears in at least one of the plurality of image segments. Examples of object detection algorithms may include: deep learning based object detection algorithms; appearance based object detection algorithms; image features based object detection algorithms; and so forth. In some examples, an image segment may be selected for each object, such that the image segment contains the image region in which the detected object appears. In some cases, such object detection algorithm may provide such image segments as a byproduct of detecting the objects.

In some examples, the image data may comprise an image, and segmenting the image data (Step 1320) may comprise: analyzing the image using a face detection algorithm to detect faces appearing in the image; selecting image segments such that each one of the detected faces appears in at least one of the plurality of image segments. Some examples of such face detection algorithms may include: deep learning based face detection algorithms; appearance based face detection algorithms; color based face detection algorithms; texture based face detection algorithms; shape based face detection algorithms; motion based face detection algorithms; boosting based face detection algorithms; and so forth. In some examples, an image segment may be selected for each face, such that the image segment contains the image region in which the detected face appears. In some cases, such face detection algorithm may provide such image segments as a byproduct of detecting the faces.

In some embodiments, generating histograms (Step 1330) may comprise generating histograms based, at least in part, on image data, such as the image data obtained by Step 1310 (obtaining image data), and/or on one or more image segments, such as the one or more image segments obtain by Step 1320 (segmenting the image data). In some examples, at least one histogram may be generated for each image segment of the image segments obtained by Step 1320 (segmenting the image data). For example, each histogram may comprise a number of bins, each bin may be associated with a range of pixel values, and each bin may be set to a value according to the number of pixels of the image segment with pixel values corresponding to the range of pixel values associated with that bin. In some cases, an image segment may be used to generate more than one histogram, and the histograms may differ from one another in: the number of bins; the range of pixel values associated with each bin; and so forth. In some examples, the values of the histogram may be normalized such that the sum of the histogram values would be one, for example by dividing each value of the histogram in the sum of all the histogram values. In another example, each histogram may comprise a number of bins, each bin may be associated with a range of image gradient lengths, and each bin may be set to a value according to the number of image gradients in the image segment with lengths corresponding to the range of image gradient lengths associated with that bin.

The Tsallis entropy of n non-negative values that sum to one, denoted $p_1, \ldots, p_n$, is defined as, $S_q(p_1, \ldots, p_n) = (q-1)^{-1}(1-p_1^q-\ldots-p_n^q)$. The parameter q of the Tsallis entropy is called entropic index. In some embodiments, the Tsallis entropy of the values of one or more histograms may be calculated, for example using one or more entropic index, therefore calculating the Tsallis entropy for each histogram and each entropic index. Any valid entropic index may be used, such as: 0.1, 0.2, 0.3, 0.4, 0.5, 0.6, 0.7, 0.8, 0.9, and so forth.

In some embodiments, associating image regions with categories (Step 1340) may comprise associating each image segment of a plurality of image segments with a category of a plurality of categories. For example, the plurality of image segments may comprise at least some of the image segments obtain by Step 1320 (segmenting the image data). For example, the plurality of categories may comprise a first category and a second category. In some examples, an association rule may be obtained, and each image segment may be associated with a category based, at least in part, on the association rule. For example, the association rule may be preprogrammed manually. In another example, the association rule may be the result of training machine learning algorithms on training examples. The training examples may include examples of association of image segments and categories. In an additional example, the association rule may be the result of deep learning algorithms. In another example, the association rule may be based, at least in part, on the output of one or more neural networks. In some examples, the association rule may be based, at least in part, on one or more Tsallis entropies of the values of one or more histograms associated with the image segment. For example, a manually preprogrammed association rule may compare a threshold with a Tsallis entropy of a histogram associated with an image region, associate the image segment with a first category if the Tsallis entropy is lower than the threshold, and associate the image segment with a second category otherwise. In another example, the association rule may be the result of training machine learning algorithms on training examples. The training examples may include examples of association of categories and vectors of Tsallis entropies values, the Tsallis entropies values in a vector may comprise Tsallis entropies values calculated for histograms associated with an image segment with one or more entropic indexes. In some embodiments, associating image regions with categories (Step 1340) may comprise associating each image segment of a plurality of image segments with a category of a plurality of categories based, at least in part, on a Tsallis entropy value with an entrophic index smaller than 0.5. For example, the a Tsallis entropy value with an entrophic index smaller than 0.5 may be compared with a threshold, and the association may be based, at least in part, on the comparison result. In some embodiments, associating image regions with categories (Step 1340) may comprise associating each image segment of a plurality of image segments with a category of a plurality of categories based, at least in part, on a ratio of a Tsallis entropy value with one entrophic index to a Tsallis entropy value with another entrophic index, for example on a ratio of a Tsallis entropy value with an entrophic index smaller than ½, such as 0.1, 0.2, 0.3, 0.4 etc., to a Tsallis entropy value with an entrophic index greater than ½, such as 0.6, 0.7, 0.8, 0.9, etc. For example, the ratio may be compared with a threshold, and the association may be based, at least in part, on the comparison result.

In some embodiments, classifying an image segment may comprise classifying an images segment using a classification model to classify the image segment to one of a plurality of classes. For example, the classification model may comprise a manually preprogrammed classification rule. In another example, the classification model may be the result of training machine learning classification algorithms on training examples. The training examples may include examples of image segments and desired classes. Examples of such machine learning classification algorithms may include: deep learning classification algorithm; support vector machine (SVM) classification; boosting classification, such as adaboost; Fisher's LDA; and so forth. In another example, the classification model may be based, at least in part, on the output of one or more neural networks.

In some examples, classifying the image segment may be based, at least in part, on one or more histograms associated with the image segment. For example, the classification model may comprise a manually preprogrammed classification rule that chooses a class based, at least in part, on the content of the one or more histograms. In another example, the classification model may be the result of training machine learning classification algorithms on training examples. The training examples may include examples of histograms and the corresponding desired classes. Examples of such machine learning classification algorithms may include: deep learning classification algorithm; support vector machine (SVM) classification; boosting classification, such as adaboost; Fisher's LDA; and so forth. In another example, the classification model may be based, at least in part, on the output of one or more neural networks that takes the one or more histograms as input.

In some examples, classifying the image segment may be based, at least in part, on one or more Tsallis entropies of the values of one or more histograms associated with the image segment. For example, the classification model may comprise a manually preprogrammed classification rule that chooses based, at least in part, on the values of the Tsallis entropies. In another example, the classification model may be the result of training machine learning classification algorithms on training examples. The training examples may include examples of vectors of Tsallis entropies and the corresponding desired classes. Examples of such machine learning classification algorithms may include: deep learning classification algorithms; support vector machine (SVM) classifiers; boosting classifiers, such as adaboost; Fisher's LDA; and so forth. In another example, the classification model may be based, at least in part, on the output of one or more neural networks that takes the Tsallis entropies as input.

In some embodiments, classifying image regions associated with a first category (Step 1350) may comprise classifying the image segments associated with the first category by Step 1340 to obtain classification information, for example using the methods for classifying an image segment described above.

In some embodiments, classifying image regions associated with a second category (Step 1430) may comprise classifying the image segments associated with the second category by Step 1340 to obtain a second classification information, for example using the methods for classifying an image segment described above. In some examples, classifying the image segments associated with the second category by Step 1340 may be based, at least in part, on information received by Step 1420.

In some embodiments, transmitting classification information (Step 1360) may comprise transmitting classification information, such as the classification information obtained by Step 1350, using one or more communication devices, such as communication modules 230, internal communication modules 440, external communication modules 450, and so forth. In some examples, transmitting classification information (Step 1360) may comprise transmitting classification information, such as the classification information obtained by Step 1350, to an external device, for example to an external device executing process 1400.

In some embodiments, receiving classification information (Step 1410) may comprise receiving classification information, such as the classification information obtained by Step 1350, the classification information transmitted by Step 1360, etc., using one or more communication devices, such as communication modules 230, internal communication modules 440, external communication modules 450, and so forth.

In some embodiments, transmitting information related to image regions associated with a second category (Step 1370) may comprise transmitting information related to image segments, such as image segments associated with the second category by Step 1340, using one or more communication devices, such as communication modules 230, internal communication modules 440, external communication modules 450, and so forth. In some examples, transmitting information related to image regions associated with a second category (Step 1370) may comprise transmitting information related to image segments, such as image segments associated with the second category by Step 1340, to an external device, for example to an external device executing process 1400. In some examples, the external device may classify the image segments associated with the second category based, at least in part, on the transmitted information, for example by performing Step 1430.

In some embodiments, receiving information related to image regions associated with a second category (Step 1420) may comprise receiving information related to image segments, such as image segments associated with the second category by Step 1340, using one or more communication devices, such as communication modules 230, internal communication modules 440, external communication modules 450, and so forth.

It will also be understood that the system according to the invention may be a suitably programmed computer, the computer including at least a processing unit and a memory unit. For example, the computer program can be loaded onto the memory unit and can be executed by the processing unit. Likewise, the invention contemplates a computer program being readable by a computer for executing the method of the invention. The invention further contemplates a machine-readable memory tangibly embodying a program of instructions executable by the machine for executing the method of the invention.

What is claimed is:

1. A system comprising:
   at least one communication device;
   at least one image sensor configured to capture an image from an environment; and
   at least one processing unit configured to:
   segment the image to extract a plurality of image regions;
   analyze the plurality of image regions to generate a plurality of histograms associated with the plurality of image regions;
   compute a plurality of Tsallis entropy values associated with the plurality of histograms;
   based on the plurality of Tsallis entropy values, associate each image region of the plurality of image regions with a category of a plurality of categories, the plurality of categories comprises at least a first category and a second category;
   based, at least in part, on the plurality of histograms, classify image regions associated with the first category to obtain classification information;
   transmit to an external device, using the at least one communication device, the classification information; and
   transmit to the external device, using the at least one communication device, information related to image regions associated with the second category, wherein the external device is configured to classify the image regions associated with the second category based on the transmitted information.

2. The system of claim 1, wherein segmenting the image comprises:
   generating a similarity matrix by calculating similarities between pairs of pixels; and
   extracting singular vectors of the similarity matrix.

3. The system of claim 1, wherein segmenting the image comprises analyzing the image using an object detection algorithm to detect an object appearing in the image; and wherein the object appears in at least one of the plurality of image regions.

4. The system of claim 1, wherein the plurality of histograms is a plurality of histograms of pixel values.

5. The system of claim 1, wherein the plurality of Tsallis entropy values comprises at least one Tsallis entropy value with an entrophic index smaller than $\frac{1}{2}$.

6. The system of claim 1, wherein associating image regions with categories is based on a ratio of a Tsallis entropy value with an entrophic index smaller than $\frac{1}{2}$ to a Tsallis entropy value with an entrophic index greater than $\frac{1}{2}$.

7. The system of claim 1, wherein the information related to image regions associated with the second category comprises at least part of the plurality of Tsallis entropy values.

8. The system of claim 1, wherein the information related to image regions associated with the second category comprises at least part of the plurality of histograms.

9. A method comprising:
   capturing an image from an environment using at least one image sensor;
   segmenting the image to extract a plurality of image regions;
   analyzing the plurality of image regions to generate a plurality of histograms associated with the plurality of image regions;
   computing a plurality of Tsallis entropy values associated with the plurality of histograms;
   based on the plurality of Tsallis entropy values, associating each image region of the plurality of image regions with a category of a plurality of categories, the plurality of categories comprises at least a first category and a second category;
   based, at least in part, on the plurality of histograms, classifying image regions associated with the first category to obtain classification information;
   transmitting to an external device, using at least one communication device, the classification information; and
   transmitting to the external device, using the at least one communication device, information related to image regions associated with the second category, wherein the external device is configured to classify the image regions associated with the second category based on the transmitted information.

10. The method of claim 9, wherein segmenting the image comprises:
    generating a similarity matrix by calculating similarities between pairs of pixels; and
    extracting singular vectors of the similarity matrix.

11. The method of claim 9, wherein segmenting the image comprises analyzing the image using an object detection algorithm to detect an object appearing in the image; and wherein the object appears in at least one of the plurality of image regions.

12. The method of claim 9, wherein the plurality of histograms is a plurality of histograms of pixel values.

13. The method of claim 9, wherein the plurality of Tsallis entropy values comprises at least one Tsallis entropy value with an entrophic index smaller than ½.

14. The method of claim 9, wherein associating image regions with categories is based on a ratio of a Tsallis entropy value with an entrophic index smaller than ½ to a Tsallis entropy value with an entrophic index greater than ½.

15. The method of claim 9, wherein the information related to image regions associated with the second category comprises at least part of the plurality of Tsallis entropy values.

16. The method of claim 9, wherein the information related to image regions associated with the second category comprises at least part of the plurality of histograms.

17. A non-transitory computer readable medium comprising a software product comprising data and computer implementable instructions for carrying out the method of claim 9.

\* \* \* \* \*